US006496229B1

United States Patent
Limberg

(10) Patent No.: US 6,496,229 B1
(45) Date of Patent: Dec. 17, 2002

(54) TV RECEIVER USING READ-ONLY MEMORY SHARED DURING VSB AND QAM RECEPTION FOR SYNCHRODYNING I-F SIGNAL TO BASEBAND

(75) Inventor: Allen LeRoy Limberg, Vienna, VA (US)

(73) Assignee: Samsung Electronics Co., Ltd., Kyongki-do (KR)

( * ) Notice: Subject to any disclaimer, the term of this patent is extended or adjusted under 35 U.S.C. 154(b) by 0 days.

(21) Appl. No.: 09/285,240

(22) Filed: Apr. 2, 1999

Related U.S. Application Data

(60) Provisional application No. 60/080,472, filed on Apr. 2, 1998, and provisional application No. 60/121,930, filed on Feb. 26, 1999.

(51) Int. Cl.[7] ................................................. H04N 5/44
(52) U.S. Cl. ........................ 348/725; 348/726; 348/426; 348/731; 348/433.1; 348/427.1
(58) Field of Search ................................. 348/725, 726, 348/558, 426, 461, 731, 727, 433.1, 388.1, 405.1, 426.1, 427.1; 375/261; H04N 5/44

(56) References Cited

U.S. PATENT DOCUMENTS

| | | | | |
|---|---|---|---|---|
| 5,375,146 A | * | 12/1994 | Chalmers | 375/344 |
| 5,410,368 A | * | 4/1995 | Krishnamurthy et al. | 348/505 |
| 5,506,636 A | * | 4/1996 | Patel et al. | 348/725 |
| 5,546,138 A | * | 8/1996 | Krishnamurthy et al. | 348/536 |
| 5,588,025 A | * | 12/1996 | Strolle et al. | 375/316 |
| 5,606,579 A | * | 2/1997 | Patel et al. | 348/725 |
| 5,638,140 A | * | 6/1997 | Krishnamurthy et al. | 331/34 |
| 5,724,396 A | * | 3/1998 | Claydon et al. | 375/355 |
| 5,787,123 A | * | 7/1998 | Okada et al. | 370/203 |
| 5,793,818 A | * | 8/1998 | Claydon et al. | 375/326 |
| 5,841,814 A | * | 11/1998 | Cupo | 329/304 |
| 5,956,328 A | * | 9/1999 | Sato | 370/204 |
| 6,067,329 A | * | 5/2000 | Kato et al. | 329/304 |
| 6,184,921 B1 | * | 2/2001 | Limberg | 348/14.06 |
| 6,304,621 B1 | * | 10/2001 | Samueli et al. | 375/350 |

* cited by examiner

Primary Examiner—John Miller
Assistant Examiner—Linus H. Lo
(74) Attorney, Agent, or Firm—Sughrue Mion, PLLC

(57) ABSTRACT

In a digital TV receiver a single digital complex multiplier is used for digitally synchrodyning digital intermediate-frequency signal to baseband both during the reception of VSB digital television signals and during the reception of QAM digital television signals. The component digital multipliers of the complex multiplier are provided by read-only memories (ROMs). The complex digital carriers used by the complex multiplier are supplied from further read-only memory storing sine/cosine look-up tables for the QAM carrier and for the VSB carrier as,translated to the final intermediate-frequency band. This further read-only memory is addressed by a sample count and an indication of whether VSB or QAM digital television signal is currently being received.

13 Claims, 8 Drawing Sheets

TV RECEIVER USING READ-ONLY MEMORY SHARED DURING VSB AND QAM RECEPTION FOR SYNCHRODYNING I-F SIGNAL TO BASEBAND

This application is filed under 35 U.S.C. 111(a) claiming pursuant to 35 U.S.C. 119(e)(1) benefit of the filing date of provisional application Ser. No. 60/080,472 filed Apr. 2, 1998, pursuant to 35 U.S.C. 111(b), and benefit of the filing date of provisional application Ser. No. 60/121,930 filed Feb. 26, 1999, pursuant to 35 U.S.C. 111(b).

The invention relates to television receivers capable of receiving vestigial-sideband amplitude-modulation (VSB) digital television (DTV) signals as used in terrestrial broadcasting in the United States and also capable of receiving quadrature-amplitude-modulation (QAM) digital television signals as used in cablecasting or direct satellite broadcasting (DBS) in the United States.

BACKGROUND OF THE INVENTION

Receivers for VSB DTV signals are described by C. B. Patel and A. L. R. Limberg in U.S. Pat. No. 5,479,449 issued Dec. 26, 1995 with the title "DIGITAL VSB DETECTOR WITH BANDPASS PHASE TRACKER, AS FOR INCLUSION IN AN HDTV RECEIVER". In the described receivers the VSB DTV signals are converted to a frequency band just above baseband and are then digitized before being synchrodyned to baseband in the digital regime. The synchrodyning is done using a digital complex multiplier. Hilbert transform filtering responsive to a stream of real samples from the analog-to-digital converter generates a stream of imaginary samples, which stream of imaginary samples together with a delayed stream of the real samples supply a complex multiplicand signal to the complex multiplier. Read-only memory addressed by a sample counter supplies a complex digital carrier wave from sine/cosine look-up tables, which complex digital carrier wave is applied to the complex multiplier as a complex multiplier signal. The product output signal from the complex multiplier comprises as real and imaginary components thereof an in-phase (I) synchronous demodulation signal and a quadrature-phase (Q) synchronous demodulation signal. The I synchronous demodulation signal is descriptive of baseband symbol coding. The Q synchronous demodulation signal is used as a basis for generating automatic frequency and phase control (AFPC) signal of local oscillations supplied to the mixer for converting the VSB DTV signals to the frequency band just above baseband.

The use of infinite-impulse response filters for developing complex multiplicand signal for the digital complex multiplier in DTV receivers of bandpass tracker type is described by C. B. Patel and A. L. R. Limberg in U.S. Pat. No. 5,548,617 issued Aug. 20, 1996, with the title "DIGITAL VSB DETECTOR WITH BANDPASS PHASE TRACKER USING RADER FILTERS, AS FOR USE IN AN HDTV RECEIVER". The use of finite-impulse response filters for developing complex multiplicand signal for the digital complex multiplier in DTV receivers of bandpass tracker type is described by C. B. Patel and A. L. R. Limberg in U.S. Pat. No. 08/577,469 issued Dec. 22, 1995 with the title "DIGITAL VSB DETECTOR WITH BANDPASS PHASE TRACKER USING NG FILTERS, AS FOR USE IN AN HDTV RECEIVER". QAM/VSB DTV receivers in which receivers both QAM and VSB DTV signals are processed through the same intermediate-frequency amplifiers to generate a final I-F signal are described by C. B. Patel and A. L. R. Limberg in U.S. Pat. No. 5,715,012 issued Feb. 3, 1998 with the title "RADIO RECEIVERS FOR RECEIVING BOTH VSB AND QAM DIGITAL HDTV SIGNALS". The DTV signals are converted to a frequency band just above baseband and are then digitized before being synchrodyned to baseband in the digital regime. The real samples of the digitized final I-F signal are supplied to real-samples-to-complex-samples conversion circuitry to generate complex multiplicand signal for a digital complex multiplier for demodulating QAM DTV signals and for another digital complex multiplier for demodulating VSB DTV signals. The complex multiplier for demodulating QAM DTV signals multiplies the complex multiplicand signal by a complex multiplier signal supplied from sine/cosine look-up tables for the QAM DTV carrier stored in read-only memory addressed by a sample counter. The resulting complex product has a real component and an imaginary component corresponding to the results of in-phase and quadrature-phase synchrodynes to baseband in the digital regime. The complex product is supplied to a symbol synchronizer before symbol decoding. The digital complex multiplier for demodulating VSB DTV signals multiplies the complex multiplicand signal by a complex multiplier signal supplied from sine/cosine look-up tables for the VSB DTV carrier stored in read-only memory addressed by a sample counter, following procedures similar to those disclosed in U.S. Pat. No. 5,479,449. U.S. patent application Ser. No. 5,606,579 issued Feb. 25, 1997 to C. B. Patel and A. L. R. Limberg with the title "DIGITAL VSB DETECTOR WITH FINAL I-F CARRIER AT SUBMULTIPLE OF SYMBOL RATE, AS FOR HDTV RECEIVER" and U.S. Pat. No. 5,659,372 issued Aug. 19, 1997 to C. B. Patel and A. L. R. Limberg with the title "DIGITAL TV DETECTOR RESPONDING TO FINAL-IF SIGNAL WITH VESTIGIAL SIDEBAND BELOW FULL SIDEBAND IN FREQUENCY" are also of interest. The C. B. Patel et alii patents referred to above are all assigned to Samsung Electronics Co., Ltd., pursuant to employee invention agreements already in force at the time the inventions disclosed in these patents were made.

The complex multipliers described in these patents are constructed of component digital multipliers that generate only a real component of a complex product or only an imaginary component of a complex product. These component digital multipliers can be constructed using multiplier and multiplicand registers and logic circuitry. Such component multipliers have latent delay of several samples, which latent delays introduce undesirable additional delay into the feedback loop(s) that generate automatic frequency and phase control (AFPC) signal of local oscillations supplied to the mixer for converting the DTV signals to the frequency band just above baseband. Using read-only memories (ROMs) storing look-up tables of the products of multiplicand and multiplier signals received as partial (read) addresses, to provide the component digital multipliers of a complex multiplier used in demodulating DTV signals, eliminates latent delay in the component multiplications. This avoids introduction of undesirable additional delay into the AFPC loop(s).

The ROMs used as the component digital multipliers generally take up more area on a monolithic integrated circuit die than do multipliers constructed using multiplier and multiplicand registers and logic circuitry, the inventors observe. So in a QAM/VSB DTV receiver it is desirable, the inventors point out, to use the same complex multiplier for digitally synchrodyning digital intermediate-frequency signal to baseband during both the reception of VSB digital television signals and the reception of QAM digital television signals. Different complex carriers are used as the multiplier input signal during the reception of VSB digital television signals and during the reception of QAM digital television signals.

SUMMARY OF THE INVENTION

Using read-only memories (ROMs) storing look-up tables of the products of multiplicand and multiplier signals received as partial (read) addresses, to provide the component digital multipliers of a complex multiplier used in demodulating DTV signals, eliminates latent delay in the component multiplications. This avoids introduction of undesirable additional delay into the AFPC loop that controls the frequency and phase of local oscillations used in converting the DTV signals to the frequency band just above baseband, prior to digitization of the DTV signals and application of the digitized DTV signals to the complex multiplier as multiplicand signal.

A preferred embodiment of the invention in QAM/VSB DTV receivers uses a single digital complex multiplier for demodulating both QAM and VSB DTV signals as received at different times. The component digital multipliers of the complex multiplier are provided by ROMs. The complex digital carriers used by the complex multiplier are supplied from ROMs storing sine/cosine look-up tables for the QAM carrier and for the VSB carrier as translated to the final intermediate-frequency band.

DETAILED DESCRIPTION

Figure 1:
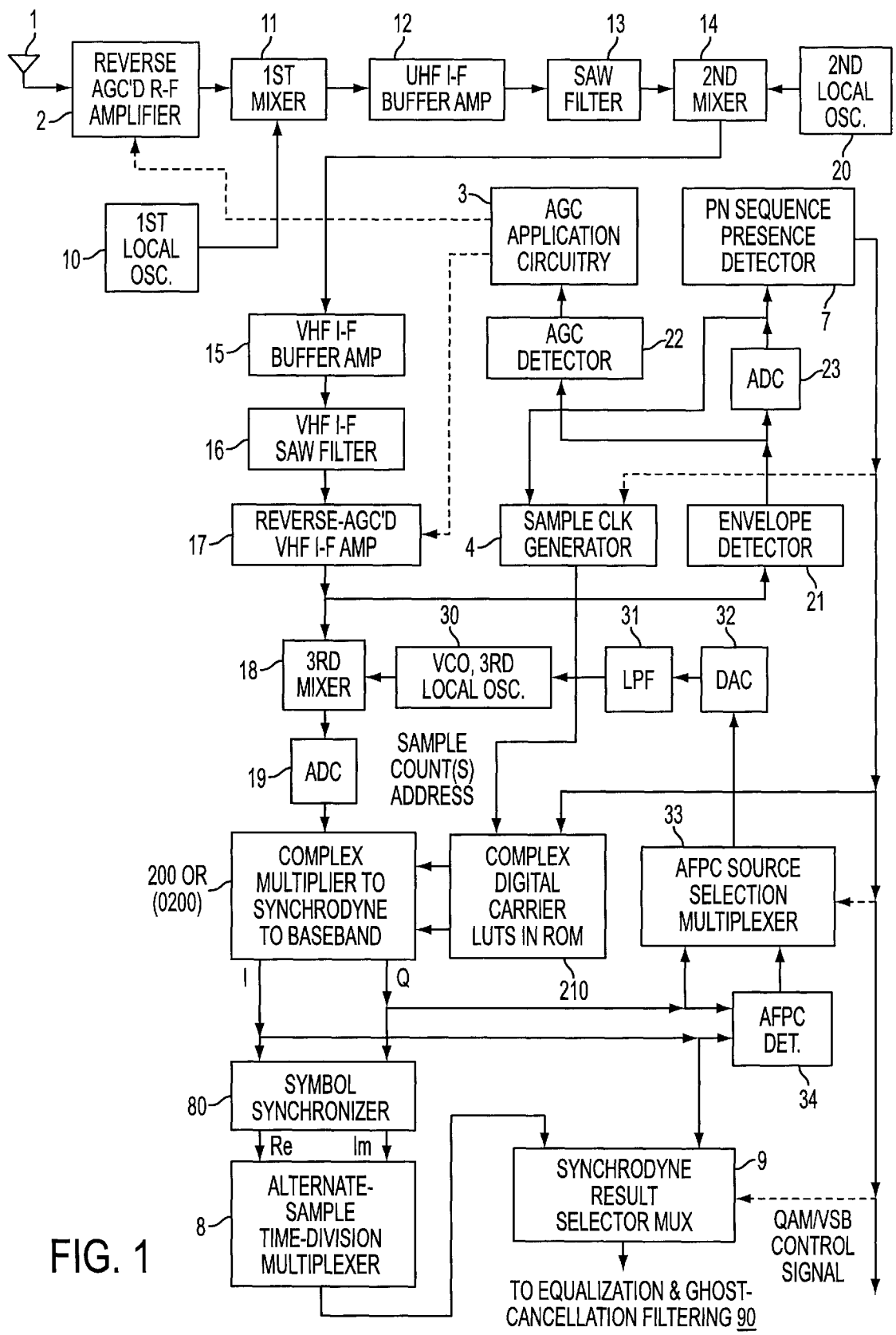
FIG. 1 is a block schematic diagram of the radio receiver portions of a QAM/VSB DTV signal receiver, which portions are used to recover baseband symbol coding for QAM DTV signal and for VSB DTV signal, with the multipliers used for synchrodyning digitized final-intermediate-frequency DTV signals to baseband being implemented in read-only memory in accordance with the invention.

FIG. 1 shows the radio receiver portions of a DTV receiver capable of receiving either QAM or VSB digital TV signals. An antenna 1 is a representative source of TV signals in ultra high frequency (UHF) band, or possibly in the very high frequency (VHF) band, which TV signals are applied to a radio-frequency (R-F) amplifier 2. The R-F amplifier 2 is provided with a tracking preselection filter for selecting a portion of the one of the television broadcast bands that contains the television signal selected for reception. The R-F amplifier 2 is reversed-AGC'd in response to delayed automatic-gain-control (delayed-AGC) signals supplied to the R-F amplifier 2 from automatic-gain-control signal application circuitry 3. The R-F amplifier 2 supplies amplified response to the television signal selected for reception.

This amplified response is mixed with a super-heterodyning signal from a first local oscillator 10 for upconversion to a high intermediate-frequency-band, which is above the highest frequency television channel in the ultra-high frequency (UHF) spectrum. In line with current TV practice, the first local oscillator 10 is usually a frequency synthesizer for generating the super-heterodyning signal of a frequency in selected ratio with the frequency of a component controlled oscillator, with the frequency of the controlled oscillator being controlled by AFT signal. This preferred practice results in the sensitivity of the super-heterodyning signal frequency to AFT signal being substantially the same for all received TV channels. The 6-MHz-wide selected radio-frequency signal supplied by the R-F amplifier 2 is upconverted to an ultra-high-frequency intermediate-frequency signal in a first mixer 11, which preferably is of a doubly-balanced linear-multiplication type. This UHF I-F signal is centered at an ultra-high frequency above that portion of the UHF band containing assigned channels for television broadcasting, placing the image frequencies well above 1 GHz so they are easily rejected by a bandpass coupling network at the output of the first mixer 11. (This coupling network is not explicitly shown in FIG. 1.)

A ultra-high-frequency-band intermediate-frequency buffer amplifier 12 applies the UHF I-F signal to a surface-acoustic-wave (SAW) filter 13. The UHF I-F buffer amplifier 12 provides fixed gain to make up the 10–12 dB insertion loss of the SAW filter 13 and drives the SAW filter 13 from a fixed source impedance chosen to avoid unwanted reflections. The SAW filter 13 has a bandwidth at least 5.38 MHz wide and determines the channel characteristics of the first I-F amplifier chain. By way of example, the UHF I-F signal can be centered at 916 MHz. A gallium arsenide SAW filter 13 can be operated satisfactorily in this frequency range. The response of the SAW filter 13 is supplied to a second mixer 14 for downconversion to a very-high-frequency intermediate-frequency signal centered at a very high frequency below that portion of the VHF band containing assigned channels for television broadcasting. This VHF I-F signal can be centered at about 44 MHz, as common in analog TV practice. A local oscillator 20, which is preferably of a crystal-controlled type, supplies a heterodyning signal of stable fixed frequency to the second mixer 14 for implementing the downconversion therein. The second mixer 14 is preferably of a doubly-balanced linear-multiplication type.

A very-high-frequency-band intermediate-frequency buffer amplifier 15 applies the VHF I-F signal to a surface-acoustic-wave (SAW) filter 16 the bandwidth of which is at least 5.38 MHz wide. The VHF I-F buffer amplifier 15 provides fixed gain to make up the 10–12 dB insertion loss of the SAW filter 16 and drives the SAW filter 16 from a fixed source impedance chosen to avoid unwanted reflections. A lithium niobate SAW filter 16 can be operated satisfactorily in the frequency range centered at about 44 MHz. The SAW filter 13, the SAW filter 16 and any trap filters included in the I-F amplifier chain are arranged to provide insofar as possible an overall linear-phase transmission channel at least 5.38 MHz wide. The introduction of Nyquist-slope and carrier-slope roll-offs are typically done in this filtering. The response of the SAW filter 16 is supplied as input signals to automatic-gain-controlled VHF-band intermediate-frequency amplifier 17.

An envelope detector 21 detects the envelope of the VHF I-F amplifier 17 response. The detected envelope is supplied to an AGC detector 22 which develops an automatic gain control (AGC) signal that responds to the peak value of the envelope, but that preferably does not respond to impulse noise spikes. The AGC signal is supplied to the automatic-gain-control signal application circuitry 3, which applies an automatic-gain-control (AGC) signal to the VHF I-F amplifier 17. In order better to preserve linearity of digital modulation in the VHF I-F amplifier 17 response, reverse AGC is employed with this amplifier. The AGC signal application circuitry 3 also supplies delayed AGC signal to the R-F amplifier 2 for reducing its gain when very strong signals are received. Gain reduction can be provided in the R-F amplifier 2 by attenuating the input signal received at its input port with an attenuator using PIN diodes in its construction, for example. This avoids strong signals being clipped in the R-F amplifier 2 or the first mixer 11.

The envelope of the VHF I-F amplifier 17 response as detected by the envelope detector 21 is sampled and the samples digitized by an analog-to-digital converter 23. The ADC 23 output signal is utilized by a sample clock generator 4 to synchronize sampling with the received DTV signal symbol code. The sample clock generator 4 and the synchronization thereof with received DTV signal symbol coding will be described in detail further on in this specification with reference to FIGURE of the drawing.

The ADC 23 output signal is applied to a PN sequence presence detector 7 as its input signal. The PN sequence presence detector 7 senses the presence of PN sequences included in the data field synchronization (DFS) signals of a VSB DTV to signal the reception of the VSB DTV signals. Detector 7 senses the absence of those PN sequences to signal the reception of TV signals other than VSB DTV signals. More particularly, the PN sequence presence detector 7 can be of a type for sensing the PN63 sequences transmitted during field sync data segments in a received VSB DTV signal. However, the PN sequence presence detector 7 preferably is of a type for sensing the PN511 sequences transmitted during those field sync data segments. The PN sequence presence detector 7 supplies indications of the absence or presence of the PN sequences transmitted during field sync data segments in a received VSB DTV signal, thereby to provide a QAM/VSB control signal indicative of whether or not the DTV signal currently being received is a VSB signal.

The VHF I-F amplifier 17 supplies its gain-controlled response as input signal to a third mixer 18. A voltage-controlled oscillator 30 supplies VHF oscillations to the third mixer 18 for heterodyning with VHF I-F amplifier 17 response to generate a final intermediate-frequency signal offset from zero frequency with its highest frequency no higher than 10.76 MHz. The VCO 30 has its frequency and phase controlled by an automatic frequency and phase control (AFPC) signal supplied as the response of an analog lowpass filter 31 to the output signal from a digital-to-analog converter 32. The digital-to-analog converter 32 receives its digital input signal from an AFPC source selection multiplexer 33. Selection of digital output signal by the multiplexer 33 is controlled by the QAM/VSB control signal.

An analog-to-digital converter 19 digitizes the final intermediate-frequency signal supplied from the third mixer 18. The digitized final I-F signal supplied from the ADC 19 is supplied to a digital complex multiplier 200 for multiplication by a complex digital carrier. The complex digital carrier that the complex multiplier 200 uses as multiplier signal is read from read-only memory circuitry 210. The ROM circuitry 210 responds to the QAM/VSB control signal to supply one complex digital carrier when VSB reception is indicated and to supply another complex digital carrier when VSB reception is counter-indicated. Each complex digital carrier is read from sine and cosine look-up tables stored in component read-only memories with the circuitry 210 that are addressed by sample count(s) supplied from the sample clock generator 4. The multiplication in digital complex multiplier 200 synchrodynes the DTV signal to baseband to generate an in-phase (I) baseband signal and a quadrature-phase (Q) baseband signal as demodulation results.

The in-phase (I) and quadrature-phase (Q) baseband signals from the complex multiplier 200 are supplied to a symbol synchronizer 80. When the I and Q signals result from demodulating a received QAM DTV signal, the symbol synchronizer 80 resolves the phasing ambiguities of the I and Q signals to recover real and imaginary baseband signals that correspond to the modulating signals transmitted by QAM. The real and imaginary baseband signals from the symbol synchronizer 80 are interleaved baseband signals are over-sampled when a QAM signal is being received, and thus the real and imaginary baseband signals from the symbol synchronizer 80 are over-sampled, interleaving is done without loss of information.

Responsive to QAM/VSB control signal from the VSB DTV reception detector 7 indicating that the received signal is not a VSB DTV signal, the DTV signal receiver is conditioned for operation in a QAM reception mode. In the QAM reception mode, the synchrodyne result selection multiplexer 9 is conditioned to forward the response of the time-division-multiplexer 8 composed of time-interleaved real and imaginary baseband signals to the equalization and ghost-cancellation filtering 90 of FIG. 2. In the QAM reception mode, the QAM/VSB control signal conditions the AFPC source selection multiplexer 33 to supply the DAC 32 input signal corresponding to the output signal from an AFPC detector 34 that responds to the in-phase (I) and quadrature-phase (Q) baseband signals from the complex multiplier 200. The AFPC detector 34 can comprise simply a multiplier in ROM for multiplying the I and Q baseband signals together, with the product being averaged over time in the AFPC lowpass filter 31 after conversion to analog form in the DAC 32. Alternatively, the AFPC detector 34 can be of a constellation phase matching type.

Responsive to the QAM/VSB control signal from the VSB DTV reception detector 7 indicating that the received signal is a VSB DTV signal, the DTV signal receiver is conditioned for operation in a VSB reception mode. In the VSB reception mode, the QAM/VSB control signal conditions the AFPC source selection multiplexer 33 to apply the quadrature-phase (Q) baseband signal from the complex multiplier 200 to the DAC 32 as its input signal. In the VSB reception mode a synchrodyne result selection multiplexer 9 selects the in-phase (I) baseband signal from the complex multiplier 200 to be forwarded as a real baseband signal to the equalization and ghost-cancellation filtering 90 of FIG. 2.

Figure 2:
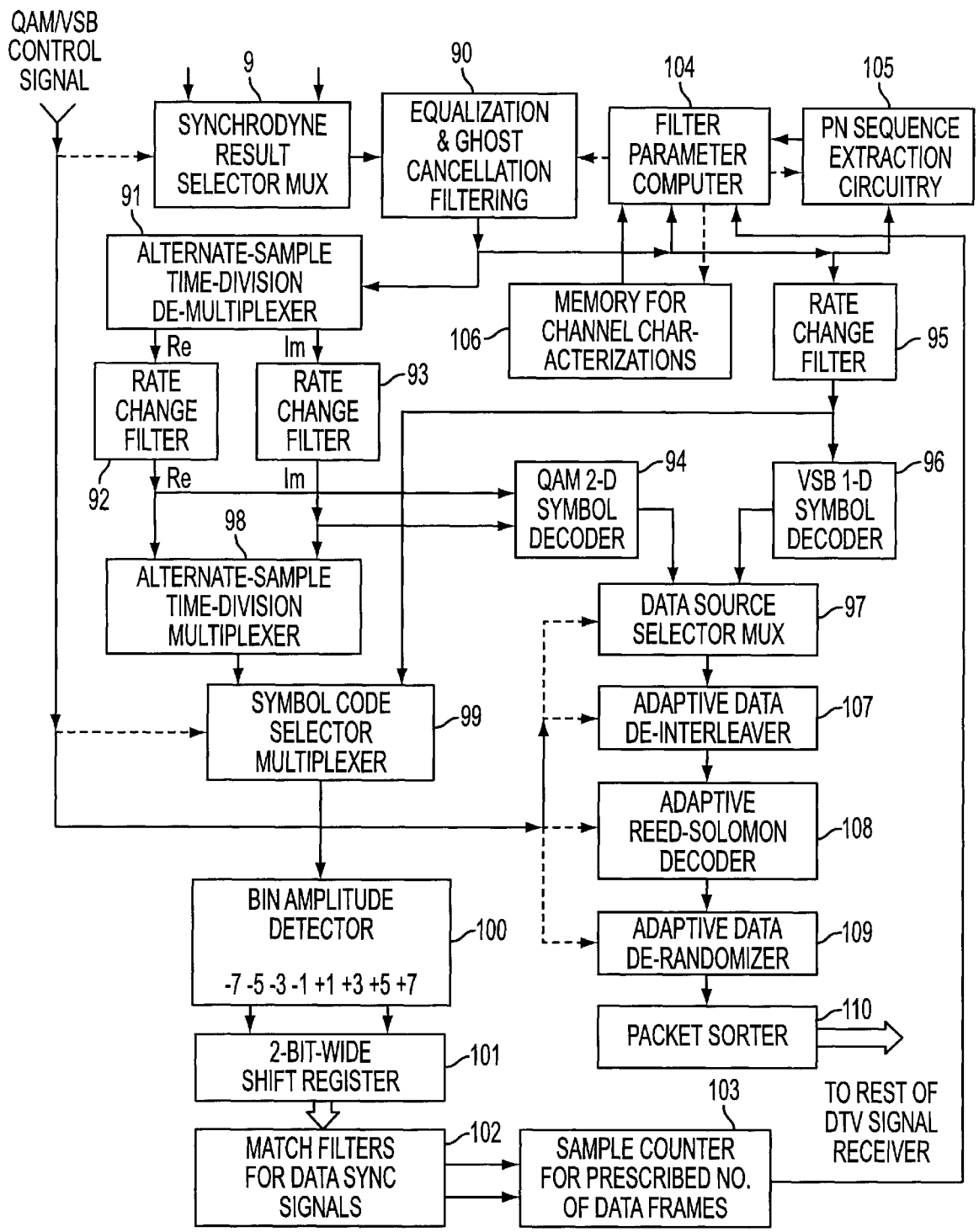
FIG. 2 is a block schematic diagram of further portions of the QAM/VSB DTV signal receiver, which further portions recover data synchronizing information and in accordance with the invention process the baseband symbol coding for QAM DTV signal and for VSB DTV signal as recovered by the FIG. 1 radio receiver portions through baseband equalization filtering used for both types of DTV signal.

The equalization and ghost-cancellation filtering 90 shown in FIG. 2 converts a baseband response with an amplitude-versus-frequency characteristic that tends to cause inter-symbol error to a more optimum amplitude-versus-frequency characteristic that minimizes the likelihood of inter-symbol error. The equalization and ghost-cancellation filtering 90 can be realized using a suitable one of the monolithic ICs available off-the-shelf for use in equalizers. Such an IC includes a multiple-tap finite-impulse-response digital filter used for amplitude-and-group-delay equalization, the tap weights of which FIR filter are programmable; circuitry for selectively accumulating training signal and temporarily storing the accumulation results; and a microcomputer for comparing the temporarily stored accumulation results with an ideal training signal as known a priori and for calculating updated tap weights of the multiple-tap digital filter used for amplitude-and-group-delay equalization. Other configurations for the equalization and ghost-cancellation filtering 90 separate the functions of ghost-cancellation and equalization to reduce the number of taps in the kernel of the filter used for final amplitude-and-group-delay equalization after ghost-cancellation is carried out by cascaded sparse-kernel filters of finite- and infinite-impulse response types. The equalization and ghost-cancellation filtering 90 can be designed such that after initial determination of filter parameters is done using a training signal to speed up convergence, the filter parameters are adjusted by data directed methods to improve dynamic operation under changing multipath conditions.

The alternate-sample time-division multiplexing of the real and imaginary samples of the baseband QAM symbol code in the response of the equalization and ghost-cancellation filtering 90 is de-multiplexed by a de-multiplexer 91. During reception of a QAM DTV transmission the de-multiplexer 91 recovers a stream of real baseband QAM symbol code samples and a stream of imaginary baseband QAM symbol code samples. These parallel streams are separate from each other and have been subjected to the same equalization and ghost-cancellation filtering in the filter circuitry 90. The stream of real baseband QAM symbol code samples is supplied from the de-multiplexer 91 to a rate-change filter 92, and the stream of real baseband QAM symbol code samples is supplied from the de-multiplexer 91 to a rate-change filter 93. The rate-change filters 92 and 93 decimate the real and imaginary streams of samples to generate respective $5.38*10^6$ samples per second response at the symbol rate for QAM. These streams of samples are applied as input signal to a two-dimensional symbol decoder 94, which performs the symbol decoding that recovers a symbol-decoded digital data stream from a QAM DTV signal and that customarily includes trellis decoding performed according to the Viterbi algorithm.

During reception of a VSB DTV transmission the response of the equalization and ghost-cancellation filtering 90 is supplied to a rate-change filter 95 that decimates the stream of real samples to $10.76*10^6$ samples per second rate, which is the symbol rate for VSB. The decimated stream of real samples is applied as input signal to a one-dimensional symbol decoder 96, which performs the symbol decoding that recovers a symbol-decoded digital data stream from a VSB DTV signal and that customarily includes trellis decoding performed according to the Viterbi algorithm The symbol decoding results from the symbol decoders 94 and 96 are respectively to a first input port and a second input port of a multiplexer 97 functioning as a data-source selector. Responsive to the QAM/VSB control signal being in the state to condition the DTV signal receiver to be in its QAM DTV signal reception mode, the multiplexer 97 reproduces at is output port the data supplied to its first input port from the symbol decoder 94. Responsive to the QAM/VSB control signal being in the state to condition the DTV signal receiver to be in its VSB DTV signal reception mode, the multiplexer 97 reproduces at is output port the data supplied to its second input port from the symbol decoder 96.

The responses of the rate-change filters 92 and 93 are time-division multiplexed on an alternate sample basis by a time-division multiplexer 98. This generates a stream of samples supplied to the first input port of a symbol code multiplexer 99 that receives at its second input port the real samples of baseband VSB symbol code in the rate-change filter 95 response. Responsive to the QAM/VSB control signal being in the state to condition the DTV signal receiver to be in its QAM DTV signal reception mode, the multiplexer 99 reproduces at its output port the alternated real and imaginary components of baseband QAM symbol code supplied to its first input port. Responsive to the QAM/VSB control signal being in the state to condition the DTV signal receiver to be in its VSB DTV signal reception mode, the multiplexer 99 reproduces at its output port the baseband VSB symbol code supplied to its second input port. The time-division multiplexer 98 alternately selects the real and imaginary components of baseband QAM symbol code supplied to the first input port of the multiplexer 99 so that the same data synchronization codes that accompany VSB DTV signal transmissions are recovered from the QAM DTV signal transmissions.

The symbol coding supplied from the output port of the symbol code multiplexer 99 is match filtered to detect the occurrence of data synchronization codes. As a step in this match filtering, bin amplitude comparator 100 decodes the symbol coding supplied from the output port of the symbol code multiplexer 99. A common form of data slicer comprises a bin amplitude comparator and read-only memory (ROM). The amplitude bins of the comparator conform to data slices of the digitized baseband symbol code signals, with the occupancy indication for the amplitude bin into which the amplitude of the current digital sample of baseband symbol code falls being a logic ONE and the occupancy indications for the other amplitude bins all being logic ZEROs. The ROM is addressed by the concurrent occupancy indications, which form a unary code, and converts that unary code to a binary code to supply parallel-bit-groups of successive symbol decoding results. This type of data slicer is termed a "hard" data slicer because of the invariance in the boundaries of the data slices, which data slices correspond to the amplitude ranges of the bins in the bin amplitude comparator. In the data slicer used for over-the-air ATSC DTV signals the bins in the bin amplitude comparator are centered on the eight levels of 3-bit symbol coding having normalized values of 7, −5, −3, −1, +1, +3, +5 and +7. The bin amplitude comparator 100 essentially corresponds to the bin amplitude comparator for such a data slicer; the ROM used in such a data slicer is here omitted as not being vital to the match filtering used for detecting the occurrence of data synchronization codes. Presuming the equalization and ghost-cancellation filtering 90 has a zero in its spectral response at zero-frequency, the bin amplitude comparator 100 essentially corresponds to the bin amplitude comparator used in a data slicer for the real or imaginary component of a QAM signal with 64-point constellation. The symbol code values associated with the +S and −S amplitude excursions of the data synclronization signals fall in the +5 and −5 bins, respectively of the bin amplitude comparator 100. These are the only symbol code values that need be detected when match filtering to detect data synchronization signals. Accordingly, if one desires, the construction of the bin amplitude comparator 100 can be simplified by consolidating the −3, −1, +1 and +3 amplitude bins.

The bin amplitude comparator 100 supplies the occupancy results from its +5 and −5 bins as 2-parallel-bit serial input to a plural-stage shift register 101 used as a serial-in/parallel-out register to supply input signals to match filters 102 for the data synchronization signals. One bit from each of the 2-parallel-bit output signals of four consecutive stages of the shift register 101, selected in accordance with the ONEs in those signals when a data segment synchronization code segment is being detected, are ANDed in a four-input AND gate (not specifically shown in FIG. 2) to detect the data segment synchronization code segment and generate a DATA SEGMENT START (or DSS) signal. An ODD DATA FIELD START (or ODFS) signal and an EVEN DATA FIELD START (or EDFS) signal can be generated by match filtering the data field synchronization codes in their entirety using a 699- or 700-stage shift register 101. However, the ODFS and EDFS signals can be generated satisfactorily using only a 188- or 189-stage shift register 101. Presuming a 189-stage shift register 101 to be used, one bit from each of the 2-parallel-bit output signals of each of those 189 stages, selected in accordance with the ONEs in those signals when the triple PN sequence in an odd data field synchronization code segment is being detected, is supplied to a first 189-input digital adder network and the resulting sum supplied to a first threshold detector that generates the ODD DATA FIELD START signal only if the sum from the first adder network exceeds a prescribed value greater in substantial measure than one-hundred twenty-six and somewhat less than one-hundred eighty-nine. And one bit from each of the 2-parallel-bit output signals of each of the 189 stages in shift register 101, selected in accordance with the ONEs in those signals when the triple PN sequence in an even data field synchronization code segment is being detected, is supplied to a second 189-input digital adder network and the resulting sum supplied to a second threshold detector that generates the EVEN DATA FIELD START signal only if the sum from the second adder network exceeds a prescribed value. The first and second adder networks can share certain adders in common.

A sample counter 103 counts the samples in the baseband symbol codes for a number at least one of data frames. The sample count comprises a least significant portion in which counting is done modulo-832, 832 being the number of samples in a data segment; a more significant segment-count portion in which counting is done modulo-313, 313 being the number of data segments in a data field; and a most significant field-count portion in which counting of data fields is done modulo-$2^N$, N being an integer at least one. The least significant portion of the sample count at the time one of the matched filters 102 generates a DATA SEGMENT START (or DSS) signal is checked within the sample counter 103 to determine whether it is four. The least significant portion of the sample count is corrected if it is not four.

At the time one of the matched filters 102 generates an ODD DATA FIELD START signal, the segment-count portion of the sample count is checked within the sample counter 103 to determine whether it is one. The segment-count portion of the sample count is corrected to one if it is not one. The field-count portion of the sample count is checked within the sample counter 103 to determine whether it is odd, and the field-count portion of the sample count is corrected to be odd if it is not odd.

At the time one of the matched filters 102 generates an EVEN DATA FIELD START signal, the segment-count portion of the sample count is checked within the sample counter 103 to determine whether it is one. The segment-count portion of the sample count is corrected to one if it is not one. The field-count portion of the sample count is checked within the sample counter 103 to determine whether it is even, and the field-count portion of the sample count is corrected to be even if it is not even.

The sample count from the sample counter 103 is used by a microcomputer 104 to control certain of its operations and to control certain operations of the PN sequence extraction circuitry 105. The microcomputer 104 calculates the filtering parameters for the adaptive filters of the equalization and ghost-cancellation filtering 90. PN sequence extraction circuitry 105 selectively responds to the filtering 90 response to separate the PN sequences that occur during data field synchronization segments of baseband symbol coding and also to separate the ghosts of those PN sequences. The microcomputer 104 responds to the sample count from the sample counter 102 indicating the initial data segment of a data frame appears in the filtering 90 response to condition the PN sequence extraction circuitry 105 to gate the initial data segment of each data field to line storage memory (not explicitly shown in FIG. 2) within the PN sequence extraction circuitry 105.

The microcomputer 104 has a non-volatile memory 106 associated therewith for storing channel characterization information between times a channel is tuned, including times the DTV receiver is not in use and power is shut off from the receiver at least in principal part. The memory 106 is preferably a part of larger non-volatile channel memory (not shown in the drawing) which stores for each programmed channel:

(a.) information concerning source of signal, such as cable or satellite narrowcast or terrestrial broadcast;

(b.) whether the channel is locked-out for viewing unless keying code is submitted (to prevent children viewing certain channels, etc.);

(c.) preferred antenna orientation for satellite narrowcast or terrestrial broadcast;

(d.) tuning information for the first local oscillator 10, which is presumed to be a frequency synthesizer; and (e.) channel characterization information in regard to principal fixed ghosts stored in the memory 106.

Addresses for most of this larger non-volatile channel memory can be supplied from a programmable read-only memory (PROM) addressable by channel number and a code indicating the source of signal to be accessed or alternatively by an up/down counter controlled by a human programmer.

When a channel is re-tuned, the channel characterization information in regard to principal, higher-energy fixed ghosts stored in the non-volatile memory 106 is used by the microcomputer 104 to compute of an initial set of filtering parameters for the adaptive filters of the equalization and ghost-cancellation filtering 90. This computation takes considerably less time than required if, before the computation of the initial set of filtering parameters could proceed, training signal had to be acquired from the newly tuned DTV channel and the channel had to be then characterized from the training signal. Accordingly, rapid tuning between channels is facilitated.

After the initial set of filtering parameters for the adaptive filters of the equalization and ghost-cancellation filtering 90 is computed, the initial data segments of data fields stored in line storage memory within the PN sequence extraction circuitry 105 under control of the microcomputer 104 are utilized as training signal for adjusting the initial set of filtering parameters for the adaptive filters of the equalization and ghost-cancellation filtering 90. The transmission channel is characterized anew preparatory to adjusting the initial set of filtering parameters, to correct for changes in static ghosting conditions arising if the DTV signal receiver has been moved since the channel was last tuned, and to suppress static ghosts of lesser energy than those described stored in the non-volatile memory 106. Differentially combining corresponding samples in initial data segments of the odd and even data fields of the ATSC DTV signal facilitates the separation of a PN63 sequence and its ghosts from other components of those initial data segments, for use in channel characterization per methods known in the art, for example.

After the adjustment of the filtering parameters for the adaptive filters of the equalization and ghost-cancellation filtering 90 is computed from the training signal, there can be continuing adjustment of the filtering parameters carried out by the microcomputer 104 using data directed methods. This permits suppression of dynamic ghosts during changing fade conditions.

The data selected by the data source selection multiplexer 97 are applied to a data de-interleaver 107 as its input signal, and the de-interleaved data supplied from the data de-interleaver 107 are applied to a Reed-Solomon decoder 108. The data de-interleaver 107 is often constructed within its own monolithic IC and is made so as to respond to the output indications from the VSB DTV reception detector 7 to select the de-interleaving algorithm suitable to the DTV signal currently being received, whether it be of QAM or VSB type. The Reed-Solomon decoder 108 is often constructed within its own monolithic IC and is made so as to respond to the output indications from the VSB DTV reception detector 7 to select the appropriate Reed-Solomon decoding algorithm for the DTV signal currently being received, whether it be of QAM or VSB type. Error-corrected data are supplied from the Reed-Solomon decoder 108 to a data de-randomizer 109, which responds to these data for regenerating a signal randomized prior to transmission to the DTV receiver, which regenerated signal comprises packets of data for a packet sorter 110. The data de-randomizer 109 is made so as to respond to the output indications from the VSB DTV reception detector 7 to select the appropriate data de-randomizing algorithm for the DTV signal currently being received, whether it be of QAM or VSB type. The packet sorter 110 sorts packets of data for different applications, responsive to header codes in the successive packets of data. The use of such sorted packets in a DTV signal receiver using stereophonic loudspeakers and a kinescope display device is described in U.S. Pat. No. 5,715,012 entitled "RADIO RECEIVERS FOR RECEIVING BOTH VSB AND QAM DIGITAL HDTV SIGNALS" that issued Feb. 3, 1998 to C. B. Patel and A. L. R. Limberg.

Figure 3:
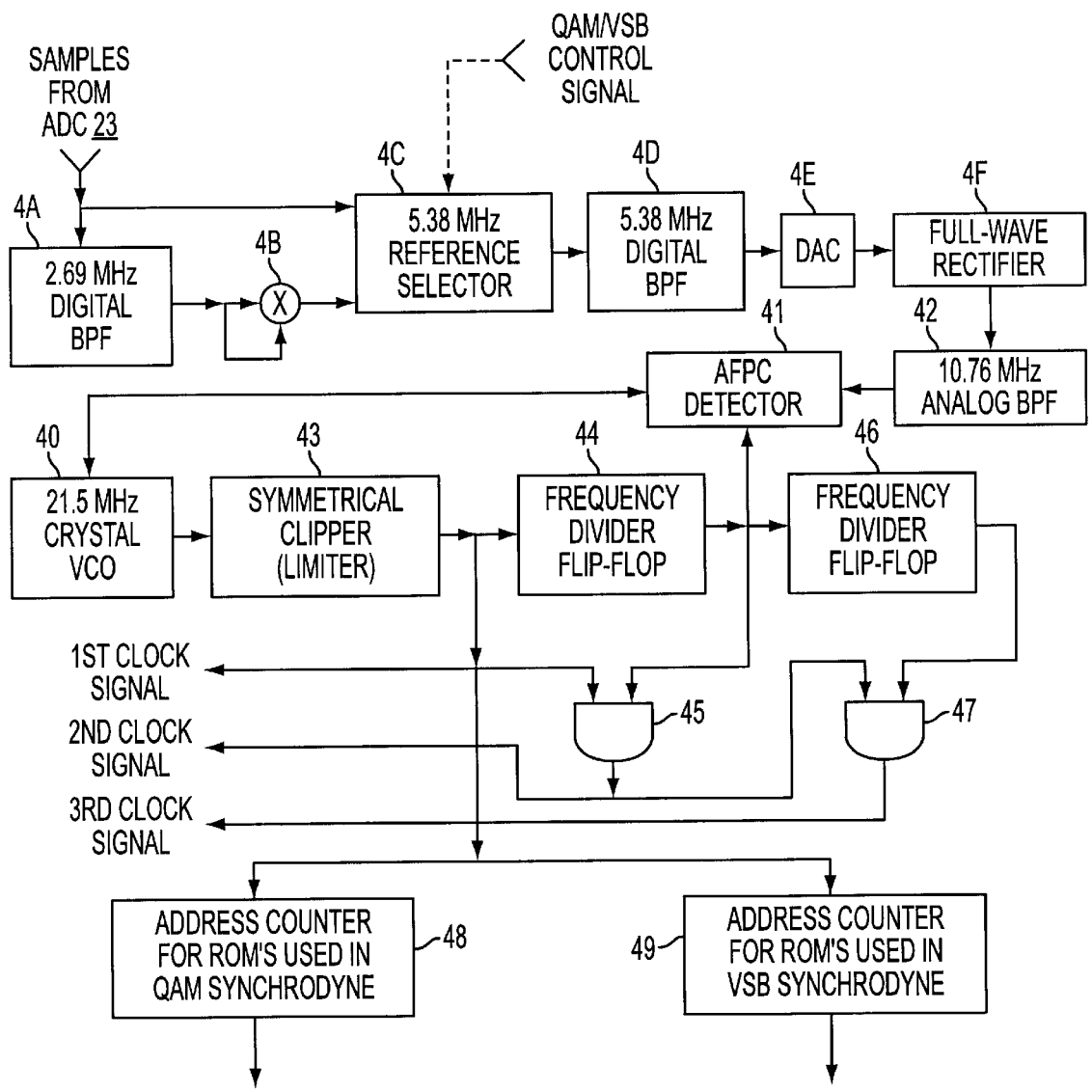
FIG. 3 is a detailed block schematic diagram of circuitry for providing the sample clock generator and the address generators for look-up table read-only memories (ROMs) for supplying digital descriptions of the complex carriers used for synchrodyning digital QAM signals and digital VSB signals at final I-F signal frequencies each to baseband.

FIG. 3 shows in detail a representative construction of the sample clock generator 4 shown in FIG. 1. This construction includes a voltage-controlled oscillator 40 that generates cissoidal oscillations nominally of 21.52 MHz frequency. The oscillator 40 is a controlled oscillator, the frequency and phase of its oscillations being controlled by an automatic frequency and phase control (AFPC) signal voltage. This AFPC signal voltage is generated by an automatic frequency and phase control (AFPC) detector 41, which compares frequency-divided response to the oscillations of the oscillator 40 with a 10.76 MHz reference carrier supplied from an analog bandpass filter 42. Preferably, oscillator 40 is of a type using a crystal for stabilizing the natural frequency and phase of its oscillations. A symmetrical clipper or limiter 43 generates an essentially squarewave response to these cissoidal oscillations, which is used as the first clock signal for timing the sampling of final I-F signals by the ADC 19 shown in FIG. 1. A first frequency-divider flip-flop 44 responds to transitions of the first clock signal in a prescribed sense for generating another square wave with a fundamental frequency of 10.76 MHz, half the frequency of the oscillations of the oscillator 40. The frequency-divider flip-flop 44 supplies squarewave output signal with a fundamental frequency of 10.76 MHz to an AND circuit 45 to be ANDed with the first clock signal for generating a second clock signal used by the rate change filter 93 (shown in FIG. 2) for implementing 2:1 decimation.

A second frequency-divider flip-flop 46 responds to transitions of the second clock signal in a prescribed sense for generating another square wave with a fundamental frequency of 5.38 MHz, which is applied to an AND circuit 47 to be ANDed with the AND circuit 45 response for generating a third clock signal used by the rate change filter 91 (shown in FIG. 2) for implementing 4:1 decimation. The square wave with a fundamental frequency of 10.76 MHz provided from the flip-flop 44 is the frequency-divided response to the oscillations of the oscillator 40 supplied to the AFPC detector 41 for comparison with the 10.76 MHz reference carrier supplied from the bandpass filter 42.

The frequency-divider flip-flop 44 supplies the count input to a sample counter 48, which generates addresses for the component read-only memories in the read-only memory circuitry 210 that store sine and cosine look-up tables descriptive of the complex carrier of a QAM DTV signal. The counter 48 counts to the value required to read a complete cycle of sine values and cosine values of the QAM complex carrier and then rolls over to its initial count value to continue counting samples. The frequency-divider flip-flop 44 also supplies the count input to a sample counter 49, which generates addresses for the component read-only memories in the read-only memory circuitry 210 that store sine and cosine look-up tables descriptive of the complex carrier of a VSB DTV signal. The counter 49 counts to the value required to read a complete cycle of sine values and cosine values of the VSB complex carrier and then rolls over to its initial count value to continue counting samples. In certain circumstances the counters 48 and 49 can share components or can even be the same counter.

The 10.76 MHz reference carrier selected by the bandpass filter 42 is generated by extracting a component of the received DTV signal as detected by the envelope detector 21 shown in FIG. 1, which component is of a frequency that is a subharmonic of the symbol frequency (or baud frequency), and multiplying that subharmonic by an appropriate factor in frequency multiplier circuitry. The FIG. 1 analog-to-digital converter (ADC) 23 digitizes the response of the envelope detector 21, so that the subharmonic of the symbol frequency can be extracted by digital filtering in a tracking filter operation within the sample clock generator 4. These extraction procedures will be explained with reference to FIG. 3.

When the received DTV signal is a QAM signal having a $5.38*10^6$ symbol per second symbol code rate, the digitized envelope detector response will have a strong component at 2.69 MHz, the first harmonic of that code rate. A bandpass FIR digital filter 4A provides a selective response centered at 2.69 MHz to the ADC 24 output signal, which selective response is supplied to a squaring circuit 4B. The bandpass FIR digital filter 4A will selectively respond to the first subharmonic of the QAM symbol rate from the digitized envelope detector response to QAM DTV signal. The squaring circuit 4B will respond with an output signal having a strong 5.38 MHz component. A digital multiplexer 4C responds to the VSB DTV reception detector 7 (shown in FIG. 1) indicating that the received DTV signal is not a VSB signal, to select the output signal of the squaring circuit 4B for application to a bandpass filter 4D that provides a selective response centered at 5.38 MHz. The squaring circuit 4B is shown in FIG. 3 as a digital multiplier receiving the filter 4A response both as multiplier and multiplicand. The squaring circuit 4A can be constructed from logic gates as a digital multiplier, but for the sake of speedier operation is better provided by a ROM storing a look-up table of squares. An absolute-value circuit can be used as a substitute for the squaring circuit in generating harmonics of the response of a preceding filter, but produces weaker second harmonics and so is not preferred.

When the received DTV signal is a VSB signal having a $10.76*10^6$ symbol per second symbol code rate, the digitized envelope detector response will have a strong component at 5.38 MHz, the first harmonic of that code rate. The digital multiplexer 4C responds to the VSB DTV reception detector 7 indicating that the received DTV signal is a VSB signal, to select the ADC 24 output signal having a strong 5.38 MHz component for direct application to the bandpass FIR digital filter 4D. The digital bandpass filter 4D selectively responds to the strong 5.38 MHz component appearing in the digital multiplexer 4C output signal when QAM or VSB DTV signal is received. This selective response is applied to a digital-to-analog converter 4E, which responds with an analog 5.38 MHz signal that is rectified by a full-wave rectifier 4F. The analog bandpass filter 42 selects from the full-wave rectifier 4F output signal the 10.76 MHz reference carrier supplied from bandpass filter 42 to the AFPC detector 41. The full-wave rectifier 4F can be replaced by a squaring device, but the rectifier 4F is preferred for generating the 10.76 MHz reference carrier because the phase relationship between its 10.76 MHz output signal and its 5.38 MHz input signal is well-defined.

Figure 4:
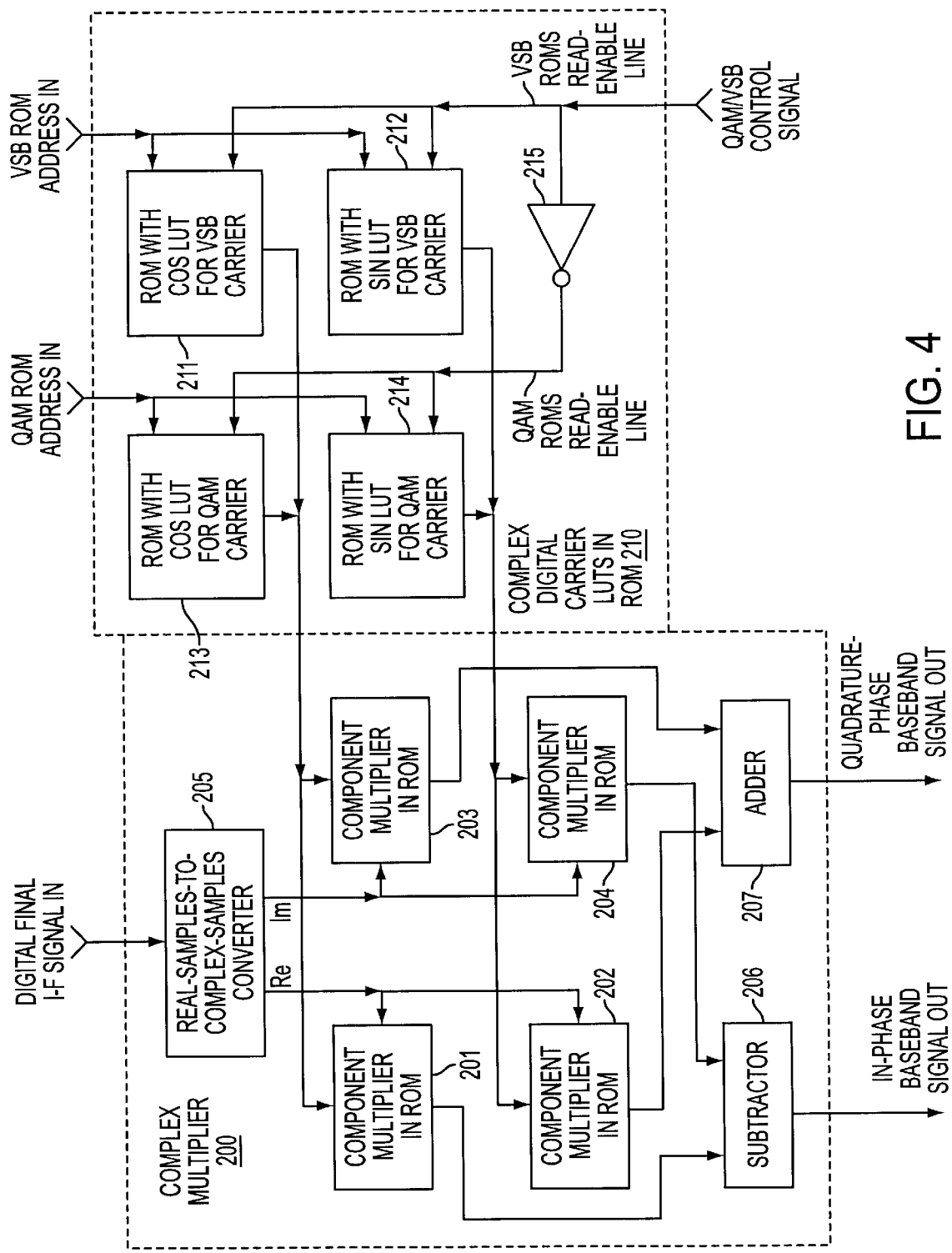
FIG. 4 is a detailed block schematic diagram of circuitry used in certain embodiments of the invention for demodulating QAM DTV signal and VSB DTV signal as translated to a final intermediate-frequency band and digitized, which circuitry includes a complex multiplier composed of four component digital multipliers.

FIG. 4 shows in detail representative constructions of the complex multiplier 200 and of the read-only memory circuitry 210 used to supply complex digital carriers to the multiplier 200. The complex multiplier 200 includes a first component digital multiplier ROM 201, a second component digital multiplier ROM 202, a third component digital multiplier ROM 203, a fourth component digital multiplier ROM 204, a real-samples-to-complex-samples converter 205, a digital subtractor 206 and a digital adder 207.

The ROM circuitry 210 includes a first component ROM 211 and a second component ROM 212 storing look-up tables for the real (cosine) portion and the imaginary (sine) portion, respectively of the VSB complex digital carrier. The ROMs 211 and 212 are addressed by a parallel-bit VSB ROM address input signal. The ROMs 211 and 212 each receive the QAM/VSB CONTROL SIGNAL as its read-enable signal, being enabled for parallel-bit reading from low source impedances by the QAM/VSB CONTROL SIGNAL being a logic ONE indicative that the signal currently being received is a VSB DTV signal. When the signal currently being received is a QAM DTV signal, responsive to which the QAM/VSB CONTROL SIGNAL is a logic ZERO, the ROMs 211 and 212 exhibit very high source impedances insufficiently low to support reading to the plural-line data busses to which their output connections are respectively made.

The ROM circuitry 210 further includes a third component ROM 213 and a fourth component ROM 214 storing look-up tables for the real (cosine) portion and the imaginary (sine) portion, respectively of the QAM complex digital carrier. The ROMs 213 and 214 are addressed by a parallel-bit QAM ROM address input signal. The ROM circuitry 210 still further includes a logic inverter 215 for ones complementing, or bit complementing, the single-bit QAM/VSB CONTROL SIGNAL. The ROMs 213 and 214 are preferably of a type provided with a tri-state output buffer. The ROMs 213 and 214 each receive the complemented QAM/VSB CONTROL SIGNAL as its read-enable signal, its tri-state output buffer being enabled for parallel-bit reading from low source impedances by the complemented QAM/VSB CONTROL SIGNAL being a logic ONE indicative that the signal currently being received is not a VSB DTV signal. When the signal currently being received is a QAM DTV signal, responsive to which the complemented QAM/VSB CONTROL SIGNAL is a logic ZERO, the tri-state output buffers of the ROMs 213 and 214 exhibit very high source impedances insufficiently low to support reading to the plural-line data busses to which their output buffer connections are respectively made.

The real-samples-to-complex-samples converter 205 included in the complex multiplier 200 responds to the samples of the digital final I-F signal from the ADC 19 of FIG. 1 to supply a complex digital final I-F signal. The real-samples-to-complex-samples converter 205 can be one in which the imaginary portion of the complex digital final I-F signal is provided by the response of a Hilbert-transform digital filter and in which the real portion of the complex digital final I-F signal is provided by delaying the samples of the digital final I-F signal from the ADC 19 to compensate for the delay in the Hilbert-transform digital filter. Alternatively, the real-samples-to-complex-samples converter 205 can be one in which infinite-impulse-response (IIR) digital filters with $\pi/2$ radians differential phase shift across band are employed. Such filters are described in U.S. Pat. No. 5,548,617 titled "DIGITAL VSB DETECTOR WITH BANDPASS PHASE TRACKER USING RADER FILTERS, AS FOR USE IN AN HDTV RECEIVER" and issued Aug. 20, 1996 to C. B. Patel and A. L. R. Limberg. In yet another alternative, the real-samples-to-complex-samples converter 205 can be one in which finite-impulse-response (FIR) digital filters with $\pi/2$ radians differential phase shift across band are employed. Such filters are described in U.S. Pat. No. 5,731,848 titled "DIGITAL VSB DETECTOR WITH BANDPASS PHASE TRACKER USING NG FILTERS, AS FOR USE IN AN HDTV RECEIVER" and issued Mar. 24, 1998 to C. B. Patel and A L. R. Limberg.

The first and second component digital multiplier ROMs 201 and 202 in the complex multiplier 200 receive real samples of the complex digital carrier wave from a cosine look-up table in the component ROM 211 or 213 of the read-only memory circuitry 210. The third and fourth component digital multiplier ROMs 203 and 204 receive imaginary samples of the complex digital carrier wave from a sine look-up table in the component ROM 212 or 214 of the read-only memory circuitry 210. The real-samples-to-complex-samples converter 205 responds to the digitized final I-F signal to supply real samples of the digitized final I-F signal as multiplicand input signal to the first component digital multiplier ROM 201 and to the third component digital multiplier ROM 203. The real-samples-to-complex-samples converter 205 responds to the digitized final I-F signal to supply imaginary samples of the digitized final I-F signal as multiplicand input signal to the second component digital multiplier ROM 202 and to the fourth component digital multiplier ROM 204. The subtractor 206 differentially combines the partial products from the first component digital multiplier ROM 201 and from the fourth component digital multiplier ROM 204 to generate the real portion of the complex product output signal from the complex multiplier 200. The adder 207 additively combines the partial products from the first component digital multiplier ROM 201 and from the fourth component digital multiplier ROM 204 to generate the imaginary portion of the complex product output signal from the complex multiplier 200. The difference output signal from the subtractor 206 is the in-phase (I) baseband signal that results from the digital synchrodyne to baseband that is done by the complex multiplier 200, and the sum output signal from the adder 207 is the quadrature-phase (I) baseband signal that results from that digital synchrodyne to baseband.

Figure 5:
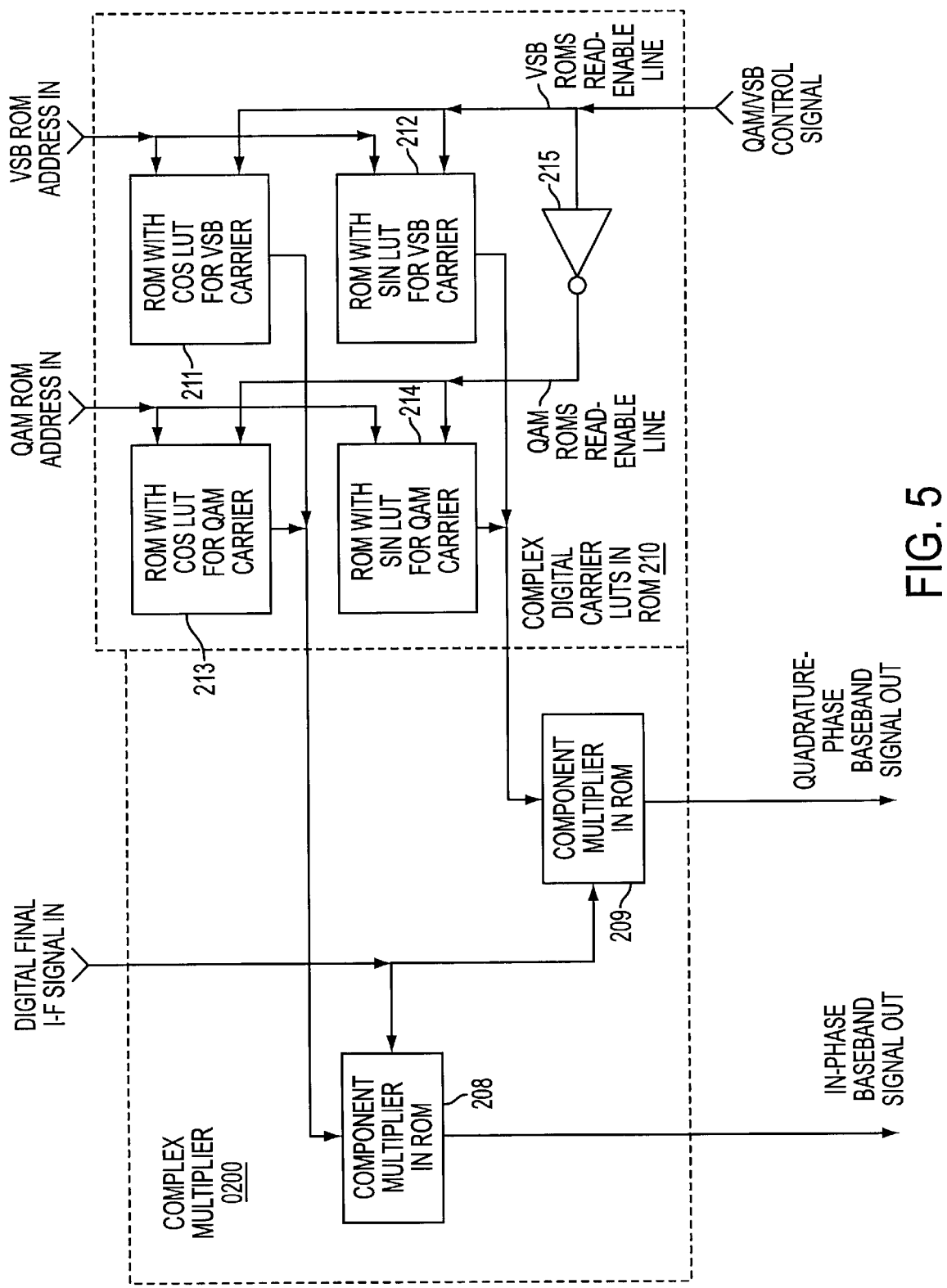
FIG. 5 is a detailed block schematic diagram of circuitry used in certain other embodiments of the invention for demodulating QAM DTV signal and VSB DTV signal as translated to a final intermediate-frequency band and digitized, which circuitry includes a complex multiplier composed of only two component digital multipliers.

FIG. 5 shows details of a simpler complex multiplier 200 that can replace the complex multiplier 200 in the FIG. 1 DTV receiver circuitry. The AFPC of the third local oscillator 30 used for the downconversion in the third mixer 18 permits the simpler complex multiplier 200, which is constructed using only two component digital multipliers 208 and 209 in ROM. Both the component digital multipliers 208 and 209 in ROM receive real samples of the digitized final I-F signal as multiplicand input signal, so no real-samples-to-complex-samples converter is required. That is, there is no imaginary component of multiplicand signal needed in the synchrodyne, which avoids having to have circuitry for obtaining the Hilbert transform of the real samples of the digitized final I-F signal.

The component digital multiplier ROM 208 in the complex multiplier 200 receives real samples of the complex digital carrier wave from a cosine look-up table in the component ROM 211 or 213 of the read-only memory circuitry 210. The component digital multiplier ROM 209 receives imaginary samples of the complex digital carrier wave from a sine look-up table in the component ROM 212 or 214 of the read-only memory circuitry 210. The product output signal from the component digital multiplier ROM 208 is the entire real portion of the complex product output signal from the complex multiplier 0200. The product output signal from the component digital multiplier ROM 209 is the entire imaginary portion of the complex product output signal from the complex multiplier 0200. The product output signal from the component digital multiplier ROM 208 is the in-phase (I) baseband signal that results from the digital synchrodyne to baseband that the complex multiplier 0200 performs. The product output signal from the component digital multiplier ROM 209 is the quadrature-phase (Q) baseband signal that results from that digital synchrodyne to baseband.

Figure 6:
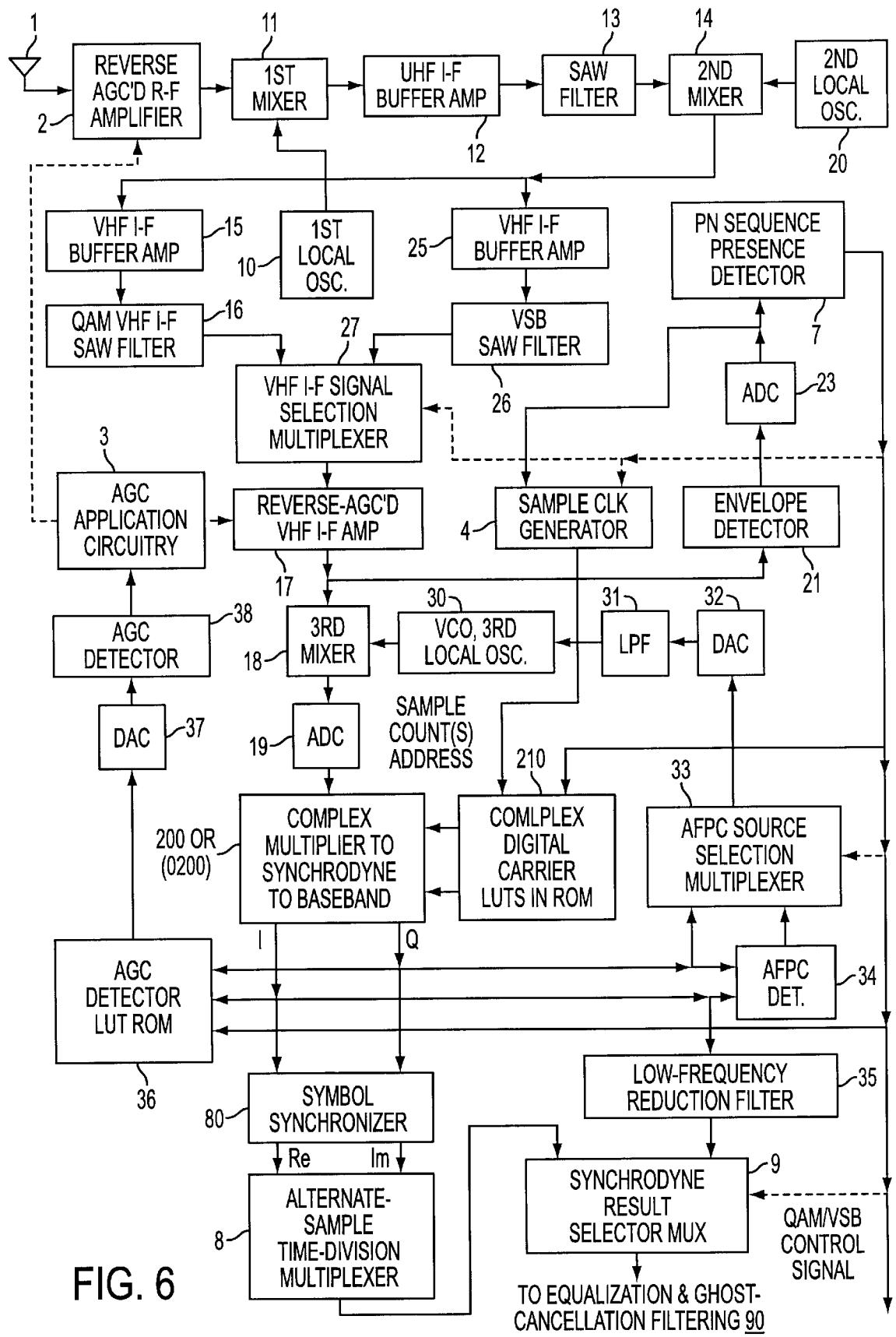
FIG. 6 is a block schematic diagram of the radio receiver portions of a QAM/VSB DTV signal receiver alternative to those in FIG. 1, which alternative portions are used to recover baseband symbol coding for QAM DTV signal and for VSB DTV signal, with the multipliers used for synchrodyning digitized final-intermediate-frequency DTV signals to baseband being implemented in read-only memory in accordance with the invention.

FIG. 6 shows radio receiver portions of another DTV receiver capable of receiving either QAM or VSB digital TV signals. The FIG. 3 DTV receiver portions differ from those of FIG. 1 in that the SAW filter 16 and the VHF I-F buffer amplifier 15 that drives the SAW filter 16 are designed just for reception of QAM DTV signals. The SAW filter 16 is designed to exhibit symmetrical response about the QAM carrier as translated to the VHF I-F band and to shape the channel to exhibit Nyquist slopes passing through frequencies 2.69 MHz above and below that QAM carrier frequency. Another SAW filter 26 and the VHF I-F buffer amplifier 25 that drives the SAW filter 26 are designed for reception of VSB DTV signals. The SAW filter 26 boosts channel gain in the frequency range immediately surrounding VSB DTV carrier as translated. to the VHF I-F band. This is done to provide a symmetrical sideband structure near pilot carrier frequency that makes quadrature-phase synchronous detection less sensitive to VSB modulation of the suppressed data carrier, thereby to improve operation of the AFPC loop for VCO 30 during VSB DTV signal reception. An analog-signal multiplexer 27 reproduces a selected one of the responses from the SAW filters 16 and 26 as its output signal, which is applied to the VHF I-F amplifier 17 as its input signal, the selection being controlled by the QAM/VSB control signal from the PN sequence presence detector 7. When the QAM/VSB control signal does not indicate VSB DTV signal reception, the multiplexer 27 reproduces the response from the SAW filter 16 as its output signal. When the QAM/VSB control signal indicates VSB DTV signal reception, the multiplexer 27 reproduces the response from the SAW filter 26 as its output signal.

The FIG. 3 DTV receiver portions differ further from those of FIG. 1 in that the in-phase (I) baseband signal that the complex multiplier 200 (or 0200) supplies is filtered by a low-frequency-reduction filter 35 before application to the synchrodyne result selector multiplexer 9. During VSB reception the synchrodyne result selector multiplexer 9 responds to QAM/VSB control signal indicating VSB DTV signal reception to reproduce the filter 35 response in its own output signal supplied as input signal to the equalization and ghost-cancellation filtering 90. The low-frequency-reduction filter 35 is a finite-impulse-response (FIR) digital lowpass filter that rolls off low frequencies to compensate for the low-frequency boost of the I baseband signal resulting from the SAW filter 26 boosting channel gain in the frequency range immediately surrounding VSB DTV carrier as translated to the VHF I-F band. This avoids compensation for the boost having to be done by the adaptive equalization and ghost-cancellation circuitry 90 of FIG. 2, which helps the equalization procedure to be initialized more quickly.

AGC of the R-F amplifier 2 and the VHF I-F amplifier 17 in the FIG. 3 DTV receiver portions could be implemented similarly to the way it was done in the FIG. 3 DTV receiver portions. Instead of developing AGC responsive to envelope detection of VHF I-F signal, however, FIG. 3 shows AGC being developed in response to synchronous detection in the complex multiplier 200 (or 0200). A-read-only memory 36 receives as partial input addresses the I and Q baseband signals that the complex multiplier 200 (or 0200) generates together with the single-bit QAM/VSB control signal.

Responsive to the QAM/VSB control signal not indicating VSB DTV signal reception, the ROM 36 reads from stored look-up tables that generate an output signal related to the square root of the sum of the squares of the I and Q baseband signals. This ROM 36 output signal indicative of the instantaneous energy of the QAM signal is converted to analog form by a digital-to-analog converter 37 for application to an AGC detector 38. The AGC detector 38 detects the peak energy of the ROM 36 output signal for generating an AGC signal supplied to the AGC signal application circuitry 3.

Responsive to the QAM/VSB control signal not indicating VSB DTV signal reception, the ROM 36 reads from stored look-up tables that generate an output signal related to the absolute value of the amplitude of the Q baseband signal, which contains no direct component attributable to the synchronous detection of pilot carrier. This ROM 36 output signal indicative of the instantaneous energy of the VSB signal is converted to analog form by the digital-to-analog converter 37 for application to the AGC detector 38. The AGC detector 38 detects the peak energy of the ROM 36 output signal for generating an AGC signal supplied to the AGC signal application circuitry 3.

Figure 7:
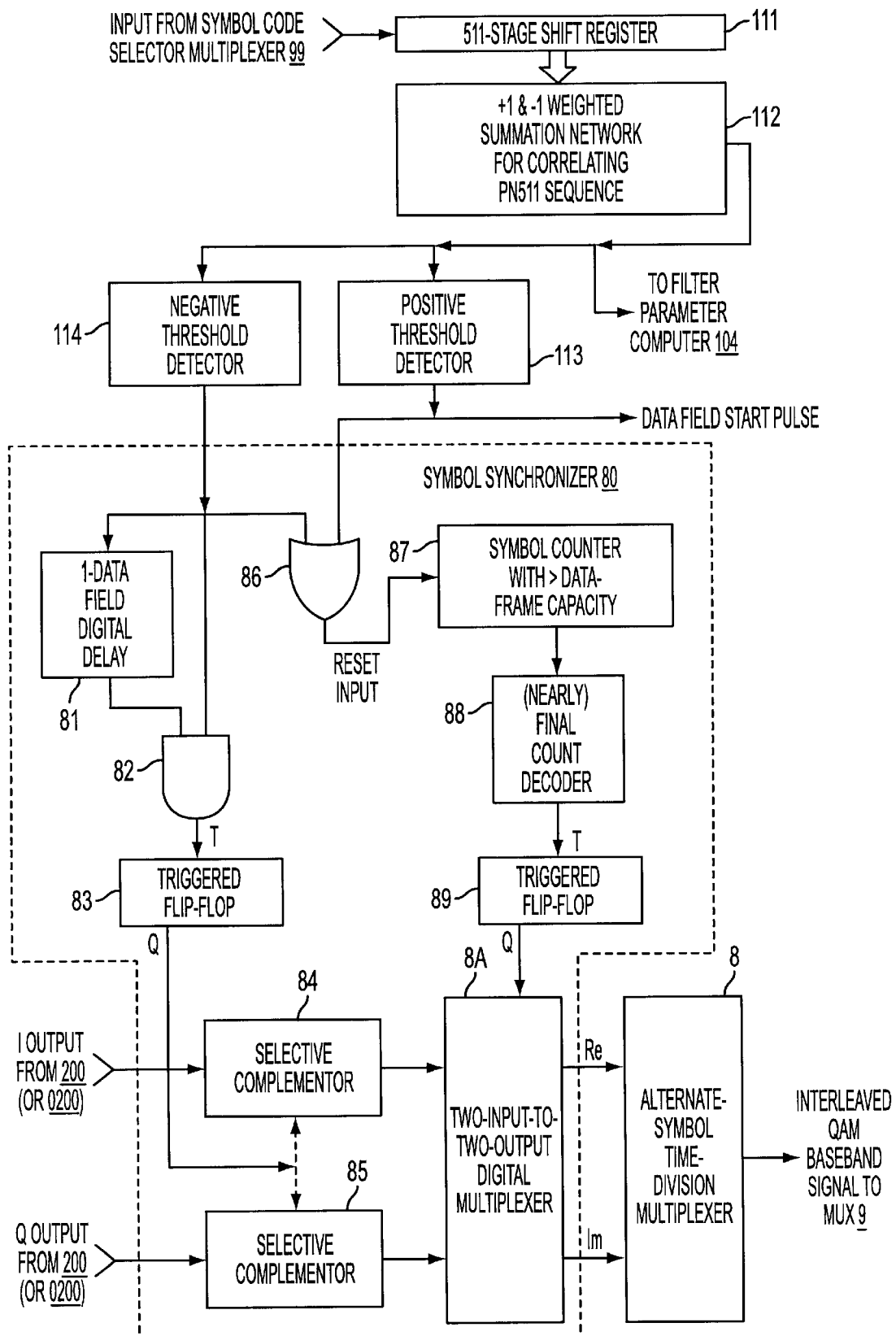
FIG. 7 is a block schematic diagram of data synchronization recovery circuitry that can be used to implement symbol synchronization during QAM signal reception.

FIG. 7 shows a way to implement the symbol synchronization circuitry 80 used in FIG. 1 or 6. The symbol code selector multiplexer 99 output signal supplies serial shift input signal to a 511-stage shift register 111, as may include the output latch of the multiplexer 99. The shift register 111 operates as a serial-in/parallel-out register to supply 511 parallel samples to a weighted summation network 112 of a correlation filter for the PN511 sequence prescribed by the ATSC standard for inclusion in the initial data segment of each data field. The weighted summation network 112 adds to its total response those samples from the shift register 111 that should correlate with ONE values of this PN511 sequence when it fills the 511 shift register 111 stages, and the weighted summation network 112 subtracts from its total response those samples from the shift register 111 that should correlate with ZERO values of this PN511 sequence when it fills the 511 shift register 111 stages.

The total response of the weighted summation network 112 can be supplied to the microcomputer 104 that calculates the filtering parameters for the adaptive filters of the equalization and ghost-cancellation filtering 90. In such case the shift register 111 and the weighted summation network 112 could be considered to be included as part of the PN sequence extraction circuitry 105.

The total response of the weighted summation network 112 exhibits positive correlation for the PN511 sequence prescribed by the ATSC standard for inclusion in the initial data segment of each data field occupying the 511 shift register 111 stages and for ghosts of the PN511 sequence. A threshold detector 113 supplies an output pulse when the total response of the weighted summation network 112 exceeds a positive threshold value that is high enough that there are no pulse responses to ghosts of the PN511 sequence, but low enough that some irregularities in the PN511 sequence owing to brief impulse noise will not prevent pulse responses to the PN511 sequence. The pulse response from the threshold detector 113 can be used as a DATA FIELD START PULSE for resetting the segment-count portion of the sample count from the sample counter 103, in place of response from one of the match filters 102. When the DTV signal receiver is in its QAM detection mode, the PN511 sequence prescribed by the ATSC standard for inclusion in the initial data segment of each data field will appear in the filtering 90 response if symbol synchronization is correct. The resulting generation of pulse response from the threshold detector 113 signals that symbol synchronization is correct.

When the DTV signal receiver is in its QAM detection mode, if symbol synchronization is incorrect owing to VCO 30 being locked at 180° from correct phasing, the complement of PN511 sequence prescribed by the ATSC standard for inclusion in the initial data segment of each data field will appear in the filtering 90 response. The total response of the weighted summation network 112 exhibits anti-correlation negative correlation for this complementary PN511 sequence occupying the 511 shift register 111 stages and for ghosts of the PN511 sequence. A threshold detector 114 supplies an output pulse when the total response of the weighted summation network 112 dips below a negative threshold value that is low enough that there are no pulse responses to ghosts of the complementary PN511 sequence, but high enough that some irregularities in the complementary PN511 sequence owing to brief impulse noise will not prevent pulse responses to the complementary PN511 sequence. The generation of pulse response from the threshold detector 114 signals that symbol synchronization is incorrect owing to the VCO 30 being locked at 180° from correct phasing, resulting in the polarity of symbols being inverted from what it should be. The occurrence of output pulse from the threshold detector 114 can be used to invert the polarity of symbols again, to correct symbol polarity.

The possibility of erroneous output pulse from the threshold detector 114 is further forestalled by applying undelayed threshold detector 114 response and that response as delayed for the duration of one data field interval in delay circuitry 81 as input signals to a two-input AND gate 82. AND gate 82 output will pulse to ONE only when the negative threshold detector 114 repeatedly detects the complement of the PN511 sequence used in the field synchronization code, each later time of detection being later than the preceding time of detection by exactly the interval of a data field.

An edge of this pulse will trigger a triggered flip-flop 83 to change the state of its true (Q) output signal. The true output signal of flip-flop 83 controls whether or not the polarities of the in-phase (I) and quadrature-phase (Q) signals received from the complex multiplier 200 (or 0200) are reversed as those signals are reproduced in the output signals from the selective complementors 84 and 85. Each of the selective complementors 84 and 85 comprises a battery of NOR gates, a respective one for each bit of the signal that selective complementor receives from the complex multiplier 200 (or 0200). Since there should be virtually no possibility of erroneous output pulse from the negative threshold detector 114, in order to reduce DTV receiver cost a bit, the flip-flop 83 can be triggered directly by such output pulse without using the error rejection filter comprising elements 81 and 82.

A two-input OR gate 86 receives the pulse responses of the positive threshold detector 113 and of the negative threshold detector 114 as respective input signals and will respond with a ONE-going pulse the initial data segment of each data field providing the I and Q signals received from the complex multiplier 200 (or 0200) are respectively real and imaginary baseband QAM signals. This ONE-going pulse resets a symbol counter 87 with the capability of counting a number of symbols greater than the number of symbols in a data field, preferably a number of symbols greater than the number of symbols in a data frame. The delay circuitry 81 is conveniently constructed using a read-and-then-write random-access memory (RAM), and the symbol counter 87 can be designed so the less significant bits of its count are suitable for addressing the RAM.

A decoder 88 generates a ONE when final count before count rollover is reached (or in alternative design) when a somewhat smaller count is reached. An edge of the ONE-going pulse supplied by the decoder 88 will trigger a triggered flip-flop 89 to change the state of its true (Q) output signal. The true output signal of flip-flop 89 controls whether a two-input-to-two-output digital multiplexer 8A will generate the real and imaginary baseband QAM signals supplied to the alternate-symbol time-division multiplexer 8 from the in-phase and quadrature-phase signals supplied by the selective complementors 84 and 85, respectively, or whether the multiplexer 8A will generate the real and imaginary baseband QAM signals supplied to the multiplexer 8 from the quadrature-phase and in-phase signals supplied by the selective complementors 85 and 84, respectively.

If the complex multiplier 200 (or 0200) detects with correct carrier phasing or with carrier phasing 180° from desired phase, the OR gate 86 will reset the symbol counter 87 so the decoder 88 will not generate a ONE-going pulse to trigger a change in the true output state of the flip-flop 89. Normally, the PN511 sequence or its complement will be detected in the initial data segment of each data field to reset the symbol counter 87. If the PN511 sequence or its complement is not detected in the initial data segment of one data field (e. g., owing to the QAM signal being accompanied by impulse noise), likely it will be detected in the initial data segment of the following data field, to reset the symbol counter 87 so the decoder 88 will not generate a ONE-going pulse to trigger a change in the true output state of the flip-flop 89. There will be no change in regard to which of the in-phase and quadrature-phase signals respectively supplied by the selective complementors 84 and 85 the multiplexer 8A will respond to for generating the real and imaginary baseband QAM signals supplied to the alternate-symbol time-division multiplexer 8.

If the complex multiplier 200 (or 0200) detects with carrier phasing 90° or 270° from desired phase, the OR gate 86 will not generate a ONE-going pulse to reset the symbol counter 87 during the initial data segments of two consecutive data fields. The symbol counter 87 will reach the count that causes the decoder 88 to generate a ONE-going pulse that triggers a change in the true output state of the flip-flop 89. The multiplexer 8A will switch which of the in-phase and quadrature-phase signals respectively supplied by the selective complementors 84 and 85 the multiplexer 8A responds to for generating the real and imaginary baseband QAM signals supplied to the alternate-symbol time-division multiplexer 8.

Figure 8:
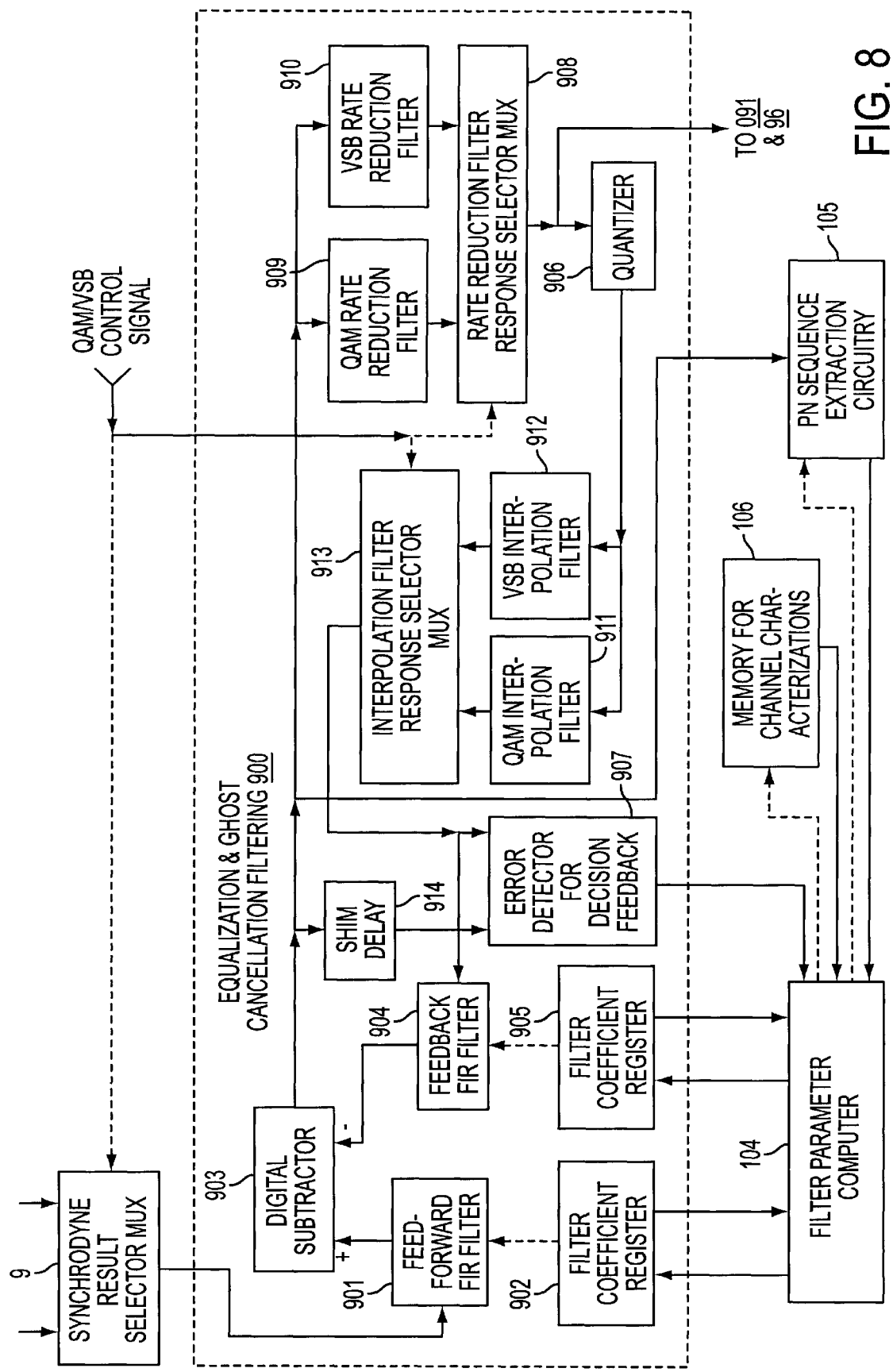
FIG. 8 is a block schematic diagram of equalization and ghost-cancellation filtering that preferably is used in a QAM/VSB DTV signal receiver that embodies the invention.

FIG. 8 shows equalization and ghost-cancellation filtering 900, which improves over off- the-shelf equalization and ghost-cancellation filtering 90. Like known equalization and ghost-cancellation filtering, the equalization and ghost-cancellation filtering 900 comprises a finite-impulse-response (FIR) digital filter 901 having filtering coefficients stored in a temporary storage register 902, a digital subtractor 903, an FIR digital filter 904 having filtering coefficients stored in a temporary storage register 905, a quantizer 906, and an error detector 907 for supplying decision feedback information to the filter-parameter computer 104. The FIR filter 901 is operated in as a feedforward FIR filter for suppressing near ghosts. The feedforward FIR filter 901 helps suppress pre-ghosts, multipath responses that are received earlier than the principal DTV signal is received. The subtractor 903, the FIR filter 904 and the quantizer 906 are connected to provide an infinite-impulse-response (IIR) filter. The FIR filter 904, which has filtering coefficients stored in a temporary storage register 905, is operated as a feedback FIR filter in this IIR filter. This IIR filter helps suppress post-ghosts, multipath responses that are received later than the principal DTV signal is received.

Ignoring the presence of severe noise in the difference output signal from the subtractor 903, the signal supplied to the quantizer 906 will change amongst ideal symbol code levels when convergence is achieved. The quantizer 906 suppresses noise that does not extend beyond data-slice boundaries. Accordingly, including the quantizer 906 within the feedback path in the IIR filter portion of the filtering 900 tends to speed up the final approach towards convergence to eliminate post-ghosts. These advantages are forfeited if the input signal for the feedback FIR filter 904 is taken directly from the difference output of the subtractor 903, instead of as shown in FIG. 8. These advantages also are forfeited if the IIR filter portion of the filtering 900 precedes, rather than succeeds, the feedforward FIR filter 401 in their cascade connection with each other. Including the quantizer 906 in the feedback loop also tends to stabilize the loop against spontaneous oscillation.

In the filtering 900, as in known equalization and ghost-cancellation filtering that receives oversampled input signal in order to execute channel equalization on an excess-bandwidth basis, there is rate reduction filtering of the subtractor 903 difference output signal for applying the signal at symbol rate to the quantizer 906. However, since filtering 900 is a dual-phase filter for QAM DTV signal and is a single-phase filter for VSB DTV signal, separate rate reduction filtering is provided for the two types of DTV signal. This departs from previous practice and is more particularly described as follows.

A rate-reduction-filter response selector multiplexer 908 is controlled by the QAM/VSB CONTROL SIGNAL. Responsive to the QAM/VSB CONTROL SIGNAL indicating that a VSB DTV signal is not being received, the multiplexer 908 applies to the quantizer 906 a quantizer input signal that corresponds to the response of a QAM rate-reduction filter 909. Responsive to the QAM/VSB CONTROL SIGNAL indicating that a VSB DTV signal is being received, the multiplexer 908 applies to the quantizer 906 a quantizer input signal that corresponds to the response of a VSB rate-reduction filter 910. Since filtering 900 is a single-phase filter for VSB DTV signal, the VSB rate-reduction filter 910 is an FIR lowpass digital filter, the response of which is a weighted summation with symmetric kernel of a plurality of successive samples of the subtractor 903 difference output signal.

The QAM rate-reduction filter 909 is an FIR lowpass digital filter, the response of which is a weighted summation with symmetric kernel of a plurality of samples of the subtractor 903 difference output signal. However, since filtering 900 is a dual-phase filter for QAM DTV signal, the weighted summation in the QAM rate-reduction filter 909 is of alternate samples of the subtractor 903 difference output signal, rather than successive samples. So the QAM rate-reduction filter 909 is unusual.

The output signal from the feedback FIR filter 904 must be supplied as subtrahend input signal to the digital subtractor 903 in a manner that will support the dual-phase filtering for QAM DTV signal and the single-phase filtering for VSB DTV signal. This is best implemented by operating the feedback FIR filter 904 with over-sampling similar to that employed in the feed-forward FIR filter 901. The quantizer 906 output signal, which is sampled at Nyquist rate, has to be re-sampled to provide input signal to the feedback FIR filter 904 at this over-sampling rate. The requirements for re-sampling the quantizer 906 output signal to implement dual-phase filtering for QAM DTV signal differ from the requirements for re-sampling the quantizer 906 output signal to implement single-phase filtering for VSB DTV signal. When a VSB DTV signal is not being received, a QAM interpolation filter 911 interpolates between the current sample of the quantizer 906 output signal and the sample two sample epochs back to provide input signal for the feedback FIR filter 904 at over-sampling rate. When a VSB DTV signal is being received, a VSB interpolation filter 912 interpolates between the current sample of the quantizer 906 output signal and the preceding sample to provide input signal for the feedback FIR filter 904 at over-sampling rate. An interpolation-filter response selector multiplexer 913 is controlled by the QAM/VSB CONTROL SIGNAL. Responsive to the QAM/VSB CONTROL SIGNAL indicating that a VSB DTV signal is not being received, the multiplexer 913 applies input signal to the feedback FIR filter 904 that corresponds to the QAM interpolation filter 911 response. Responsive to the QAM/VSB CONTROL SIGNAL indicating that a VSB DTV signal is being received, the multiplexer 913 applies input signal to the feedback FIR filter 904 that corresponds to the VSB interpolation filter 912 response.

The filter-parameter computer 104 updates the contents of the temporary storage register 902 that holds the adaptive filter coefficients for the feed forward FIR filter 901. The filter-parameter computer 104 also updates the contents of the temporary storage register 905 that holds the adaptive filter coefficients for the feedback FIR filter 904. Each of the temporary storage registers 902 and 905 is dual-ported comprising a serial-in/parallel-out (or SIPO) component register and a parallel-in/parallel-out (or PIPO) component register. The initial stage of the SIPO component register can be serially written through a serial-input port; and the final output stage of the SIPO component register can be serially read through a serial-output port, which permits selective looping of the SIPO component register. Upon command, the stages of the PIPO component register are loaded in parallel from corresponding stages of the SIPO component register. The stages of the PIPO component register in the temporary storage register 902 supply their stored computer coefficients in parallel to digital multipliers in the FIR filter 901. The stages of the PIPO component register in the temporary storage register 905 supply their stored computer coefficients in parallel to digital multipliers in the FIR filter 904.

An earliest step in a preferred procedure for establishing initial filter coefficients for the FIR filters 901 and 904 extracts filter coefficients from a memory for storing the coefficients for each DTV channel the last time it was tuned. Such procedure is described, for example, in U.S. Pat. No. 5,654,765 issued Aug. 5, 1997 to Dae-Jin Kim and entitled "CHANNEL EQUALIZER FOR DIGITAL TELEVISION RECEIVER HAVING AN INITIAL COEFFICIENT STORAGE UNIT". If the currently selected DTV channel has not been previously tuned to, the initial filter coefficients for the FIR filters 901 and 904 stored in the memory are preset values. The establishment of the initial filter coefficients for the FIR filters 901 and 904 preferably contains further steps in which:

the transmission channel is characterized based upon spectral measurements on a standardized training signal, and the filtering coefficients are adjusted to complement this characterization of channel response.

More particularly, when implementing these further steps during the reception of VSB DTV signals, the digital subtractor 903 response is supplied to the PN sequence extraction circuitry 105, which separates training signal from the data field synchronizing (DFS) signal. The training PN sequence extraction circuitry 105 contains a gating circuit (not explicitly shown, but contained within the circuitry 105) responsive to the count supplied from a data segment counter (not explicitly shown, but contained within the filter-parameter computer 104). When the count indicates that a data segment of a data field containing DFS signal and/or its ghosts appears in the digitized baseband symbol coding of the digital subtractor 903 difference output signal, the gating circuit applies the data segment from the current data field to an accumulator (not explicitly shown, but contained within the circuitry 105). The accumulator combines the DFS signals and their ghosts from a plurality of fields for extracting the ghosted training signal applied to a DFT calculator (not explicitly shown, but contained within the filter-parameter computer 104). When alternate DFS signals are differentially combined in the accumulation, accumulating the DFS signals over a cycle of six data fields or some multiple thereof suppresses artifacts of co-channel NTSC interference in the accumulation result, so channel equalization is less affected by these artifacts.

ROM 106 stores the DFT of a ghost-free "ideal" training signal for VSB reception, which training signal is lowpass filtered according to the same Nyquist slope characteristic that one seeks for the upper-frequency portion of the transmission channel. This lowpass filtering of the ghost-free "ideal" training signal having its DFT stored in ROM 106 is important for minimizing inter-symbol interference. Storing the DFT of the Nyquist-filtered ghost-free training signal in ROM 106, rather than the Nyquist-filtered ghost-free training signal itself, eliminates having to calculate its DFT. DTV receivers are designed attempting to minimize inter-symbol interference by properly shaping the spectral response of the transmission channel for transmitting the symbol coding that is translated to digital baseband form for application to the filtering 900. The spectral response is preferably subjected to final shaping after most of the amplification in the receiver has been done, so there is no introduction of a significant level of out-of-band noise by subsequent amplification. The Nyquist slopes at band edge can be established by surface-acoustic-wave filtering in VHF intermediate-frequency amplifiers of the DTV receiver, for example. As the DTV receiver is tuned from one transmission channel to another, however, there will be variations from the desired passband shape, which variations arise from causes other than multipath distortion. Such variations may arise from changing tilts in antenna gain response, for example. Lowpass filtering the "ideal" training signal according to the same Nyquist slope characteristic that one seeks for the upper-frequency portion of the transmission channel provides for automatic adjustment of the filter coefficients of the adaptive channel equalizer to optimize the overall transmission channel characteristic for minimum inter-symbol interference.

A channel characterization calculator (not explicitly shown, but contained within the filter-parameter computer 104) divides the DFT of the ghosted training signal supplied from the DFT calculator with the DFT of a ghost-free training signal supplied from the ROM 106, term by term, to generate a DFT for the transmission channel. The channel characterization calculator takes the inverse discrete Fourier transform of the DFT for the transmission channel to generate a description of the filtering effects exerted within the channel, which inverse DFT results are referred to as the "channel characterization". The channel characterization represents the filter coefficients of a filter that in the time domain would correspond to the transmission channel. The filtering 900 has filter coefficients that are complementary to those of this filter that in the time domain would correspond to the transmission channel. Therefore, the cascade connection of the filtering 900 after the transmission channel provides a composite response to transmitted VSB symbol coding which response should be substantially free from inter-symbol interference and multipath distortion effects.

QAM signals may be transmitted without any training signal to support the further steps of initialization of the initial filter coefficients of the equalization and ghost-cancellaton filtering 900 (e. g., the initial filter coefficients for the FIR filters 901 and 904). If the data in the QAM signal transmitted by the cablecaster or by DBS includes the DFS signal in the initial data segment of each data field that is used in ATSC VSB DTV broadcasting, the QAM modulation responsive to the DFS signal can be used as a training signal during QAM reception. Alternatively, the QAM transmissions may include a different training signal. If the QAM signal includes a training signal, the ROM 106 is modified so that the single-bit QAM/VSB control signal is applied as one of the bits of its address input signal, for selecting the Nyquist-filtered ghost-free training signal for VSB modulation or the Nyquist-filtered ghost-free training signal for QAM modulation. The cascade connection of the filtering 900 after the transmission channel provides a composite response to transmitted QAM symbol coding which response should be substantially free from inter-symbol interference and multipath distortion effects.

Rapid changes in multipath conditions will disrupt equalization and ghost cancellation, however, unless adaptation can be carried out based on information continuously derived from the data stream, rather than based on information derived from training signal intermittently introduced into the data stream. So, after initial adaptive filter coefficients for the FIR filters 901 and 904 are established, the filter-parameter computer 104 inputs the adaptive filter coefficients temporarily stored in the registers 902 and 905, then updates the adaptive filter coefficients using correction accumulation procedures. The corrections to be used in these accumulation procedures are generated as fractions of errors detected by the error detector 907 for implementing decision feedback according to methods similar to those used in the prior art. In the filtering 900, however, the error detector 907 generates decision feedback information for the filter-parameter computer 104 by differentially combining the FIR filter 904 input signal with the subtractor 903 difference output signal, as delayed by shim delay 914, rather than by differentially combining the quantizer 906 output and input signals as done in the prior art. (The shim delay 914 provides compensating delay for the latent delay between the output ports of the subtractor 903 and the multiplexer 913.) The difference output signal from the subtractor 903 is delayed by the shim delay 914 to compensate for the loop delay introduced by the filters 909 and 911 when receiving QAM DTV signals, and to compensate for the loop delay introduced by the filters 910 and 912 when receiving VSB DTV signals.

Deriving error signal from the subtractor 903 difference output signal before reduction in its rate facilitates updating of the adaptive coefficients for the feed-forward FIR filter 901 to secure excess-bandwidth operation. Excess-bandwidth operation is known to reduce inter-symbol interference (ISI) from observations of the performance of fixed-coefficient equalization filters. However, contrary to common belief by those skilled in the art, generating error signal for decision feedback by differentially combining the quantizer 906 output and input signals fails to secure excess-bandwidth operation. This is because filter coefficients cannot be individually optimized to reduce ISI owing to the error signal being of minimum bandwidth as established by the Nyquist rate sampling of the quantizer 906 output and input signals. The error signal for decision feedback must be excess-bandwidth in order that an adaptive equalizer will exhibit the excess-bandwidth operation that reduces ISI, it is here pointed out.

The orthogonal synchrodyne procedures used to process the real and imaginary portions of received QAM signals are sometimes carried out partially in the analog regime. For example, the third mixer may be a complex mixer supplying real and imaginary final I-F signals for digitization in separate respective analog-to-digital converters, in order to avoid the long-latent-delay digital filtering involved in real-samples-to-complex-samples conversion circuitry. In such case the channel characterization may be different for the baseband sample streams resulting from the two orthogonal synchrodyne procedures. The two sets of alternate-tap coefficients in the equalization and ghost cancellation filtering 90, especially those in the feed-forward filtering, will not necessarily correspond to each other. In such case it can be advantageous to arrange the equalizer portion of the equalization and ghost cancellation filtering 90 (e. g., the FIR feedforward filter 901 in the FIG. 8 equalization and ghost cancellation filtering 900) to be a complex filter. QAM/VSB DTV signal receivers constructed in accordance with preferred bodiments of the invention synchrodyne a single digitized final I-F signal to baseband entirely within the digital regime, so that the orthogonal synchrodyne procedures respectively processing the real and imaginary portions of received QAM signals have similar channel characterization. The two sets of alternate-tap coefficients in the equalizer can accordingly be the same except for being staggered in time. When the adjustments to be made to weighting coefficients in the equalizer are calculated by decision feedback methods, this pairing of the two sets of alternate-tap coefficients in the equalizer facilitates the adjustments being made twice as quickly for given system rate.

What is claimed is:

1. A television receiver for receiving digital television signals, said television receiver comprising:

a sample clock generator for generating a sample clock signal at a sample rate and for supplying a modular count of samples that are made in accordance with said sample clock signal;

tuner circuitry for supplying a digital final intermediate-frequency signal in response to a received digital television signal as sampled in accordance with said sample clock signal; and digital synchrodyne circuitry for synchrodyning said digital final intermediate-frequency signal to baseband to supply an in-phase demodulation result and a quadrature-phase demodulation result, said digital synchrodyne circuitry including a digital complex multiplier constructed at least partly within read-only memory for generating said in-phase demodulation result and said quadrature-phase demodulation result as components of a complex product resulting from multiplication of said digital final intermediate-frequency signal by a complex digital carrier signal.

2. The television receiver of claim 1, wherein said digital television signals are vestigial sideband digital television signals, and wherein said tuner circuitry comprises:

an analog-to-digital converter for supplying said digital intermediate-frequency signal responsive to an analog intermediate-frequency signal;

a local oscillator for supplying local oscillations of a very high frequency controlled as to frequency and phase by an automatic frequency and phase control signal obtained from said quadrature-phase demodulation result; and a mixer connected to receive as a first input signal thereof said local oscillations of a very high frequency supplied from said local oscillator, connected to receive as a second input signal thereof said received digital television signal as converted to a very-high-frequency intermediate-frequency band and amplified, and connected to supply to said analog-to-digital converter said analog intermediate-frequency signal, as a result of heterodyne between its said first and said second input signals.

3. The television receiver of claim 2, wherein said digital synchrodyne circuitry comprises a first component read-only memory addressed by said modular count of samples for supplying said complex digital carrier.

4. The television receiver of claim 3, wherein said digital complex multiplier comprises:

real-to-complex-sample conversion circuitry receptive of said digital intermediate-frequency signal from said analog-to-digital converter for supplying a real digital intermediate-frequency signal and an imaginary digital intermediate-frequency signal;

a second component read-only memory receiving said real digital intermediate-frequency signal as part of its input address, receiving a real component of said complex digital carrier as the remainder of its input address, and supplying a first partial product signal responsive to its input address;

a third component read-only memory receiving said imaginary digital intermediate-frequency signal as part of its input address, receiving an imaginary component of said complex digital carrier as the remainder of its input address, and supplying a second partial product signal responsive to its input address;

a digital subtractor connected for differentially combining said first and second partial product signals to supply said in-phase demodulation result;

a fourth component read-only memory receiving said real digital intermediate-frequency signal as part of its input address, receiving the imaginary component of said complex digital carrier as the remainder of its input address, and supplying a third partial product responsive to its input address;

a fifth component read-only memory receiving said imaginary digital intermediate-frequency signal as part of its input address, receiving a real component of said complex digital carrier as the remainder of its input address, and supplying a fourth partial product responsive to its input address; and a digital adder connected for additively combining said third and fourth partial product signals to supply said quadrature-phase demodulation result.

5. The television receiver of claim 3, wherein said digital complex multiplier comprises:

a second component read-only memory receiving said digital intermediate-frequency signal as part of its input address, receiving a real component of said complex digital carrier as the remainder of its input address, and supplying a first partial product signal responsive to its input address; and a third component read-only memory receiving said digital intermediate-frequency signal as part of its input address, receiving an imaginary component of said complex digital carrier as the remainder of its input address, and supplying a second partial product signal responsive to its input address, one of which said first and said second partial product signals is used as said in-phase demodulation result and the other of which said first and said second partial product signals is used as said quadrature-phase demodulation result.

6. The television receiver of claim 1, wherein said digital television signals are quadrature-amplitude-modulation digital television signals, wherein said tuner circuitry comprises:

an analog-to-digital converter for supplying said digital intermediate-frequency signal responsive to an analog intermediate-frequency signal;

a local oscillator for supplying local oscillations of a very high frequency controlled as to frequency and phase by an automatic frequency and phase control signal; and a mixer connected to receive as a first input signal thereof said local oscillations of a very high frequency supplied from said local oscillator, connected to receive as a second input signal thereof said received digital television signal as converted to a very-high-frequency intermediate-frequency band and amplified, and connected to supply to said analog-to-digital converter said analog intermediate-frequency signal, as a result of heterodyne between its said first and said second input signals, and wherein said television receiver further comprises an automatic frequency and phase control detector for generating said automatic frequency and phase control signal responsive to said in-phase demodulation result and said quadrature-phase demodulation result.

7. The television receiver of claim 6, wherein said digital synchrodyne circuitry comprises a first component read-only memory addressed by said modular count of samples for supplying said complex digital carrier.

8. The television receiver of claim 7, wherein said digital complex multiplier comprises:

real-to-complex-sample conversion circuitry receptive of said digital intermediate-frequency signal from said analog-to-digital converter for supplying a real digital intermediate-frequency signal and an imaginary digital intermediate-frequency signal;

a second component read-only memory receiving said real digital intermediate-frequency signal as part of its input address, receiving a real component of said complex digital carrier as the remainder of its input address, and supplying a first partial product signal responsive to its input address;

a third component read-only memory receiving said imaginary digital intermediate-frequency signal as part of its input address, receiving an imaginary component of said complex digital carrier as the remainder of its input address, and supplying a second partial product signal responsive to its input address;

a digital subtractor connected for differentially combining said first and second partial product signals to supply said in-phase demodulation result;

a fourth component read-only memory receiving said real digital intermediate-frequency signal as part of its input address, receiving the imaginary component of said complex digital carrier as the remainder of its input address, and supplying a third partial product responsive to its input address;

a fifth component read-only memory receiving said imaginary digital intermediate-frequency signal as part of its input address, receiving a real component of said complex digital carrier as the remainder of its input address, and supplying a fourth partial product responsive to its input address; and a digital adder connected for additively combining said third and fourth partial product signals to supply said quadrature-phase demodulation result.

9. The television receiver of claim 7, wherein said digital complex multiplier comprises:

a second component read-only memory receiving said digital intermediate-frequency signal as part of its input address, receiving a real component of said complex digital carrier as the remainder of its input address, and supplying a first partial product signal responsive to its input address; and a third component read-only memory receiving said digital intermediate-frequency signal as part of its input address, receiving an imaginary component of said complex digital carrier as the remainder of its input address, and supplying a second partial product signal responsive to its input address, one of which said first and said second partial product signals is used as said in-phase demodulation result and the other of which said first and said second partial product signals is used as said quadrature-phase demodulation result.

10. A television receiver capable of receiving vestigial-sideband amplitude-modulation (VSB) digital television signals and also capable of receiving quadrature-amplitude-modulation (QAM) digital television signals, said VSB digital television signals having a first prescribed symbol rate and said QAM digital television signals having a second prescribed symbol rate, said television receiver comprising:

a sample clock generator for generating a sample clock signal at a sample rate multiple to both said first prescribed symbol rate and said second prescribed symbol rate and for supplying a modular count of samples that are made in accordance with said sample clock signal;

tuner circuitry for supplying a digital intermediate-frequency signal in response to a received VSB or QAM digital television signal as sampled in accordance with said sample clock signal;

circuitry for determining whether said digital intermediate-frequency signal is supplied in response to a received VSB digital television signal or is supplied in response to a received QAM digital television signal and supplying an indication of the type of digital television signal being currently received;

digital synchrodyne circuitry including a single digital complex multiplier for synchrodyning said digital intermediate-frequency signal to baseband to supply an in-phase demodulation result and a quadrature-phase demodulation result, said digital synchrodyne circuitry demodulating said digital intermediate-frequency signal with said single digital complex multiplier responsive in a first manner to said sample count when it is determined that said digital intermediate-frequency signal is supplied in response to a received VSB digital television signal, and said digital synchrodyne circuitry demodulating said digital intermediate-frequency signal with said single digital complex multiplier responsive in a second manner to said sample count when it is determined that said digital intermediate-frequency signal is supplied in response to a received QAM digital television signal;

a symbol synchronizer for supplying real and imaginary components of demodulated QAM signal responsive to said in-phase and quadrature-phase demodulation results when said received QAM digital television signal obtains;

a two-dimensional symbol decoder for demodulated QAM signal to which, when it is determined that said digital intermediate-frequency signal is supplied in response to a received QAM digital television signal, said real and imaginary components of demodulated QAM signal are supplied after equalization; and a one-dimensional symbol decoder for demodulated VSB signal to which, when it is determined that said digital intermediate-frequency signal is supplied in response to a received VSB digital television signal, said in-phase demodulation results are supplied after equalization.

11. The television receiver of claim 10, wherein said digital synchrodyne circuitry comprises:

a first component read-only memory addressed by said modular count of samples and by said indication of the type of digital television signal being currently received for supplying a complex digital carrier, said complex digital carrier being at the frequency of the carrier of a digital intermediate-frequency VSB digital television signal when said indication indicates that a VSB digital television signal is being currently received, and said complex digital carrier being at the frequency of the carrier of a digital intermediate-frequency QAM digital television signal when said indication indicates that a QAM digital television signal is being currently received; and complex multiplier circuitry for receiving said digital intermediate-frequency signal as a multiplicand signal, for receiving said complex digital carrier as a complex multiplier signal, and for supplying said in-phase and quadrature-phase demodulation results as a complex product signal.

12. The television receiver of claim 11, wherein said complex multiplier circuitry comprises:

real-to-complex-sample conversion circuitry receptive of said real digital intermediate-frequency signal for supplying real digital intermediate-frequency signal and imaginary digital intermediate-frequency signal;

a second component read-only memory receiving said real digital intermediate-frequency signal as part of its input address, receiving a real component of said complex digital carrier as the remainder of its input address, and supplying a first partial product signal responsive to its input address;

a third component read-only memory receiving said imaginary digital intermediate-frequency signal as part of its input address, receiving an imaginary component of said complex digital carrier as the remainder of its input address, and supplying a second partial product signal responsive to its input address;

a digital subtractor connected for differentially combining said first and second partial product signals to supply said in-phase demodulation result;

a fourth component read-only memory receiving said real digital intermediate-frequency signal as part of its input address, receiving the imaginary component of said complex digital carrier as the remainder of its input address, and supplying a third partial product responsive to its input address;

a fifth component read-only memory receiving said imaginary digital intermediate-frequency signal as part of its input address, receiving a real component of said complex digital carrier as the remainder of its input address, and supplying a fourth partial product responsive to its input address; and a digital adder connected for additively combining said third and fourth partial product signals to supply said quadrature-phase demodulation result.

13. The television receiver of claim 11, wherein said complex multiplier circuitry comprises:

a second component read-only memory receiving said digital intermediate-frequency signal as part of its input address, receiving a real component of said complex digital carrier as the remainder of its input address, and supplying a first partial product signal responsive to its input address; and a third component read-only memory receiving said digital intermediate-frequency signal as part of its input address, receiving an imaginary component of said complex digital carrier as the remainder of its input address, and supplying a second partial product signal responsive to its input address, one of which said first and said second partial product signals is used as said in-phase demodulation result and the other of which said first and said second partial product signals is used as said quadrature-phase demodulation result.

\* \* \* \* \*